United States Patent
Takenami et al.

(10) Patent No.: US 10,413,970 B2
(45) Date of Patent: Sep. 17, 2019

(54) METHOD FOR MANUFACTURING THREE-DIMENSIONAL SHAPED OBJECT AND THREE-DIMENSIONAL SHAPED OBJECT

(71) Applicant: PANASONIC INTELLECTUAL PROPERTY MANAGEMENT CO., LTD., Osaka (JP)

(72) Inventors: Masataka Takenami, Aichi (JP); Satoshi Abe, Osaka (JP); Mikio Mori, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 53 days.

(21) Appl. No.: 15/329,441

(22) PCT Filed: Jul. 28, 2015

(86) PCT No.: PCT/JP2015/003789
§ 371 (c)(1),
(2) Date: Jan. 26, 2017

(87) PCT Pub. No.: WO2016/017155
PCT Pub. Date: Feb. 4, 2016

(65) Prior Publication Data
US 2017/0203366 A1    Jul. 20, 2017

(30) Foreign Application Priority Data
Jul. 30, 2014  (JP) .................................. 2014-155292

(51) Int. Cl.
*B22F 5/00* (2006.01)
*B33Y 80/00* (2015.01)
(Continued)

(52) U.S. Cl.
CPC ............ *B22F 5/007* (2013.01); *B22F 3/1055* (2013.01); *B29C 33/3842* (2013.01);
(Continued)

(58) Field of Classification Search
CPC ... B29C 33/10; B29C 33/3842; B29C 64/153; B29C 64/188; B29C 2035/0838;
(Continued)

(56) References Cited

U.S. PATENT DOCUMENTS

| 5,234,326 A | 8/1993 | Galli et al. |
| 5,368,799 A | 11/1994 | Galli et al. |

(Continued)

FOREIGN PATENT DOCUMENTS

| EP | 0451832 A2 | 10/1991 |
| EP | 0704292 A1 | 4/1996 |

(Continued)

OTHER PUBLICATIONS

US 4,937,420 A, 06/1990, Deckard (withdrawn)
(Continued)

*Primary Examiner* — Joseph S Del Sole
*Assistant Examiner* — Ninh Le
(74) *Attorney, Agent, or Firm* — Greenblum and Bernstein, P.L.C.

(57) ABSTRACT

There is provided a method for manufacturing a three-dimensional shaped object by alternate repetition of a powder-layer forming and a solidified-layer forming by an irradiation with a light beam in order to provide a selective laser sintering method capable of reducing a warp of the three-dimensional shaped object, the warp being due to a stress around an upper surface of the three-dimensional shaped object. Especially, in the present invention, a part of a region for the formation of the solidified layer is not irradiated with the light beam to form a non-irradiated (Continued)

portion, thereby providing at least one slit-groove at an upper surface of the three-dimensional shaped object, the slit-groove being for reducing a stress of the three-dimensional shaped object.

11 Claims, 15 Drawing Sheets

(51) Int. Cl.
*B33Y 10/00* (2015.01)
*B22F 3/105* (2006.01)
*B29C 33/38* (2006.01)
*B29C 45/34* (2006.01)
*B29C 64/153* (2017.01)
*B29C 33/10* (2006.01)

(52) U.S. Cl.
CPC ............ *B29C 45/34* (2013.01); *B29C 64/153* (2017.08); *B33Y 10/00* (2014.12); *B33Y 80/00* (2014.12); *B29C 33/10* (2013.01); *Y02P 10/292* (2015.11); *Y02P 10/295* (2015.11)

(58) Field of Classification Search
CPC . B29C 2033/385; B29C 45/34; B22F 3/1055; B22F 5/007; B33Y 80/00; B33Y 10/00; Y02P 10/295; Y02P 10/292; B23P 15/00
See application file for complete search history.

(56) References Cited

U.S. PATENT DOCUMENTS

| | | | |
|---|---|---|---|
| 5,534,104 A | 7/1996 | Langer et al. | |
| 6,649,113 B1 | 11/2003 | Manners et al. | |
| 7,867,431 B2 | 1/2011 | Higashi et al. | |
| 8,163,224 B2 | 4/2012 | Higashi et al. | |
| 8,550,802 B2 | 10/2013 | Fuwa et al. | |
| 8,562,897 B2 | 10/2013 | Abe et al. | |
| 8,738,166 B2 | 5/2014 | Abe et al. | |
| 8,974,727 B2 | 3/2015 | Abe et al. | |
| 8,999,222 B2 | 4/2015 | Abe et al. | |
| 9,073,264 B2 | 7/2015 | Abe et al. | |
| 9,586,285 B2 | 3/2017 | Abe et al. | |
| 9,592,554 B2 | 3/2017 | Abe et al. | |
| 9,597,836 B2 | 3/2017 | Abe et al. | |
| 9,604,282 B2 | 3/2017 | Abe et al. | |
| 2005/0142024 A1 | 6/2005 | Herzog | |
| 2012/0093674 A1 | 4/2012 | Abe et al. | |
| 2012/0308781 A1 | 12/2012 | Abe et al. | |
| 2013/0075575 A1* | 3/2013 | Abe .................... | B29C 35/0272 249/78 |
| 2014/0010908 A1 | 1/2014 | Matsumoto et al. | |
| 2015/0017055 A1 | 1/2015 | Abe et al. | |
| 2017/0066052 A1 | 3/2017 | Abe et al. | |
| 2017/0072464 A1 | 3/2017 | Takenami et al. | |

FOREIGN PATENT DOCUMENTS

| | | |
|---|---|---|
| JP | 01-502890 A | 10/1989 |
| JP | 03-193433 A | 8/1991 |
| JP | H05-346361 A | 12/1993 |
| JP | 07-503915 A | 4/1995 |
| JP | H07-285135 A | 10/1995 |
| JP | H08-080553 A | 3/1996 |
| JP | 09-226010 A | 9/1997 |
| JP | H09-226010 A | 9/1997 |
| JP | H11-200510 A | 7/1999 |
| JP | 11-227053 A | 8/1999 |
| JP | 2000-073108 A | 3/2000 |
| JP | 2001-225362 A | 8/2001 |
| JP | 2002-127260 A | 5/2002 |
| JP | 3314608 B2 | 8/2002 |
| JP | 2002-249805 A | 9/2002 |
| JP | 2005-507805 A | 3/2005 |
| JP | 2005-171299 A | 6/2005 |
| JP | 2008-101256 A | 5/2008 |
| JP | 2008-101256 A | 5/2008 |
| JP | 2009-090539 A | 4/2009 |
| JP | 2009-255349 A | 11/2009 |
| WO | 88/02677 A2 | 4/1988 |
| WO | 2010/150805 A1 | 12/2010 |

OTHER PUBLICATIONS

U.S. Appl. No. 15/513,665 to Satoshi Abe et al., which was filed Mar. 23, 2017.
Search Report issued in International Bureau of WIPO Patent Application No. PCT/JP2015/003789, dated Oct. 27, 2015.
Search Report issued in International Bureau of WIPO Patent Application No. PCT/JP2015/003789, dated Feb. 9, 2017.
Search Report issued in European Patent Office (EPO) Patent Application No. 15827786.3, dated May 15, 2017.
Office Action issued in Japanese family member Patent Appl. No. 2016-537751, dated Mar. 13, 2018.
Office Action issued in Japanese family member Patent Appl. No. 2016-537751, dated Oct. 31, 2018, along with an English translation thereof.

\* cited by examiner

100'

170

200

METHOD FOR MANUFACTURING THREE-DIMENSIONAL SHAPED OBJECT AND THREE-DIMENSIONAL SHAPED OBJECT

TECHNICAL FIELD

The disclosure relates to a method for manufacturing a three-dimensional shaped object and a three-dimensional shaped object. More particularly, the disclosure relates to a method for manufacturing a three-dimensional shaped object in which a formation of a solidified layer is performed by an irradiation of a powder layer with a light beam, and a three-dimensional shaped object obtained by the manufacturing method.

BACKGROUND OF THE INVENTION

Heretofore, a method for manufacturing a three-dimensional shaped object by irradiating a powder material with a light beam has been known (such method can be generally referred to as "selective laser sintering method"). The method can produce the three-dimensional shaped object by an alternate repetition of a powder-layer forming and a solidified-layer forming on the basis of the following (i) and (ii):

(i) forming a solidified layer by irradiating a predetermined portion of a powder layer with a light beam, thereby allowing a sintering of the predetermined portion of the powder or a melting and subsequent solidification of the predetermined portion; and (ii) forming another solidified layer by newly forming a powder layer on the formed solidified layer, followed by similarly irradiating the powder layer with the light beam. See JP-T-01-502890 or JP-A-2000-73108, for example.

This kind of technology makes it possible to produce the three-dimensional shaped object with its complicated contour shape in a short period of time. The three-dimensional shaped object can be used as a metal mold in a case where an inorganic powder material (e.g., a metal powder material) is used as the powder material. While on the other hand, the three-dimensional shaped object can also be used as various kinds of models in a case where an organic powder material (e.g., a resin powder material) is used as the powder material.

Taking a case as an example wherein the metal powder is used as the powder material, and the three-dimensional shaped object produced therefrom is used as the metal mold, the selective laser sintering method will now be briefly described. As shown in FIGS. 11A-11C, a powder layer 22 with its predetermined thickness is firstly formed on a base plate 21 by a movement of a squeegee blade 23 (see FIG. 11A). Then, a predetermined portion of the powder layer is irradiated with a light beam L to form a solidified layer 24 (see FIG. 11B). Another powder layer is newly provided on the formed solidified layer, and is irradiated again with the light beam to form another solidified layer. In this way, the powder-layer forming and the solidified-layer forming are alternately repeated, and thereby allowing the solidified layers 24 to be stacked with each other (see FIG. 11C). The alternate repetition of the powder-layer forming and the solidified-layer forming leads to a production of a three-dimensional shaped object with a plurality of the solidified layers integrally stacked therein. The lowermost solidified layer 24 can be provided in a state of being adhered to the surface of the base plate 21. Therefore, there can be obtained an integration of the three-dimensional shaped object and the base plate. The integrated "three-dimensional shaped object" and "base plate" can be used as the metal mold.

PATENT DOCUMENTS RELATED ART PATENT DOCUMENTS

PATENT DOCUMENT 1: Japanese Unexamined Patent Application Publication No. H01-502890
PATENT DOCUMENT 2: Japanese Unexamined Patent Application Publication No. 2000-73108

DISCLOSURE OF THE INVENTION

Problems to be Solved by the Invention

With respect to the selective laser sintering method as described above, the inventors of the present application have found that a non-desired stress arises in the three-dimensional shaped object, and the non-desired stress may cause a warp of the three-dimensional shaped object. When manufacturing the three-dimensional shaped object, an irradiation with the light beam allows the predetermined portion of the powder layer to be melted, and a subsequent cooling allows the melted portion to be solidified to form the solidified layer. When forming the solidified layer from the powder layer, spaces existing in the powder layer are diminished, which leads to an occurrence of a shrinkage-phenomenon. Accordingly, it can be presumed that the shrinkage-phenomenon causes the stress (especially "warp-stress") in the solidified layers, i.e., the three-dimensional shaped object made of the solidified layers.

Especially, the inventors of the present application have found that, in the three-dimensional shaped object to be finally obtained, the stress may remain around an upper surface of the three-dimensional shaped object (corresponding to the upper surface and a region near the upper surface of the three-dimensional shaped object, when defining a laminated direction of the solidified layers as an "upward direction") (see FIG. 15). While not intending to be bound by any specific theory, it can be presumed that a remaining of the stress results from a relief of the already arising stress caused by a thermal influence to the solidified layers which have been already formed by the irradiation with the light beam for the forming of a later solidified layer, when the solidified layers are laminated to manufacture the three-dimensional shaped object. In other words, the stress is not relieved in an uppermost solidified layer and solidified layers positioned near the uppermost solidified layer (even if the stress is relieved, a degree of the relief of the stress is low), and thus the stress is likely to remain in these solidified layers, i.e., around the upper surface of the three-dimensional shaped object.

Under these circumstances, the present invention has been created. That is, an object of the present invention is to provide the selective laser sintering method which is capable of reducing the warp of the three-dimensional shaped object, the warp being caused by the stress around the upper surface of the three-dimensional shaped object.

Means for Solving the Problems

In order to achieve the above object, an embodiment of the present invention provides a method for manufacturing a Three-dimensional shaped object by alternate repetition of a powder-layer forming and a solidified-layer forming, the repetition comprising:

(i) forming a solidified layer by irradiating a predetermined portion of a powder layer with a light beam, thereby allowing a sintering of the powder in the predetermined portion or a melting and subsequent solidification of the powder; and (ii) forming another solidified layer by newly forming a powder layer on the formed solidified layer, followed by an irradiation of a predetermined portion of the newly formed powder layer with the light beam, wherein a part of a region for the formation of the solidified layer is not irradiated with the light beam to form a non-irradiated portion, thereby providing at least one slit-groove at an upper surface of the three-dimensional shaped object, the slit-groove being for reducing a stress of the three-dimensional shaped object.

An embodiment of the present invention also provides a three-dimensional shaped object obtained by the above manufacturing method. Specifically, an embodiment of the present invention provides a three-dimensional shaped object made of laminated solidified layers, each of the laminated solidified layers being formed by irradiating a powder layer with a light beam, wherein the three-dimensional shaped object has at least one slit-groove at an upper surface of the three-dimensional shaped object, the slit-groove being for reducing a stress of the three-dimensional shaped object.

EFFECT OF THE INVENTION

According to an embodiment of the present invention, the stress arising around the upper surface of the three-dimensional shaped object can be reduced. Therefore, the warp of the three-dimensional shaped object obtained by the selective laser sintering method is reduced.

MODES FOR CARRYING OUT THE INVENTION

Figure 1:
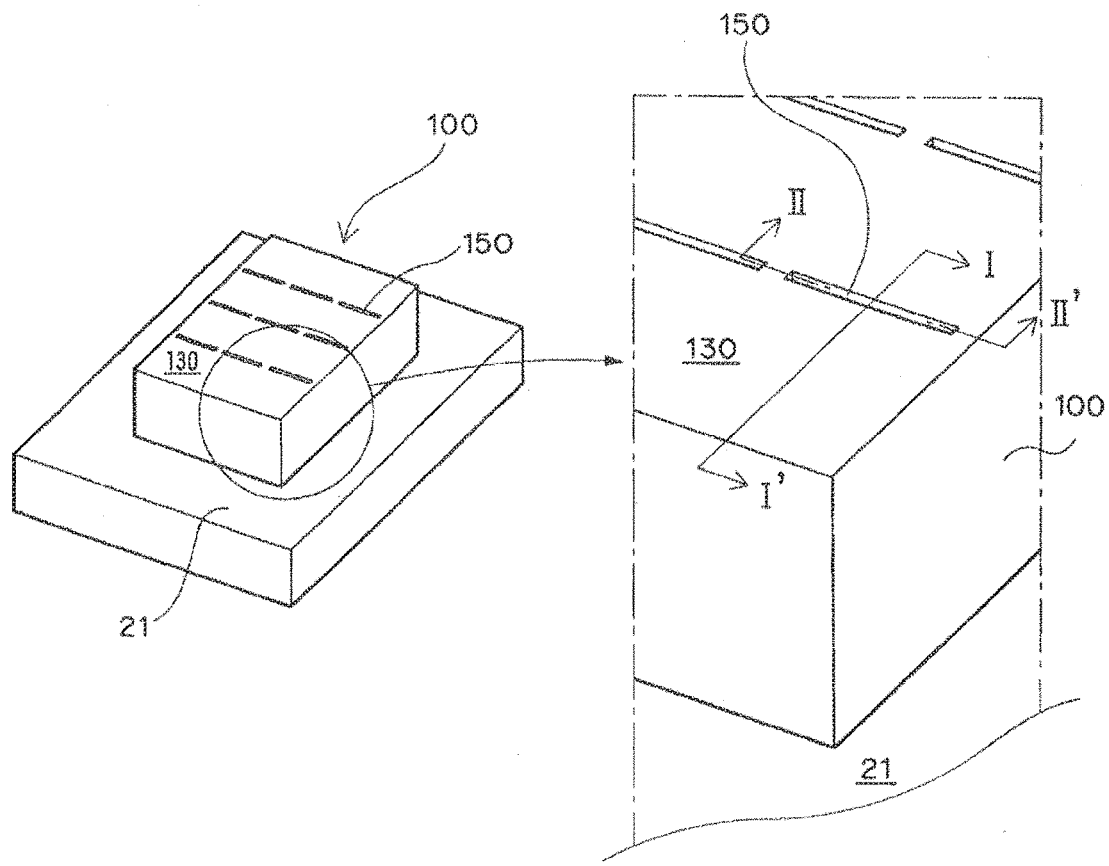
FIG. 1 is a perspective view and a cross-sectional view schematically illustrating a form of the three-dimensional shaped object obtained by the manufacturing method according to an embodiment of the present invention.
Figure 1:
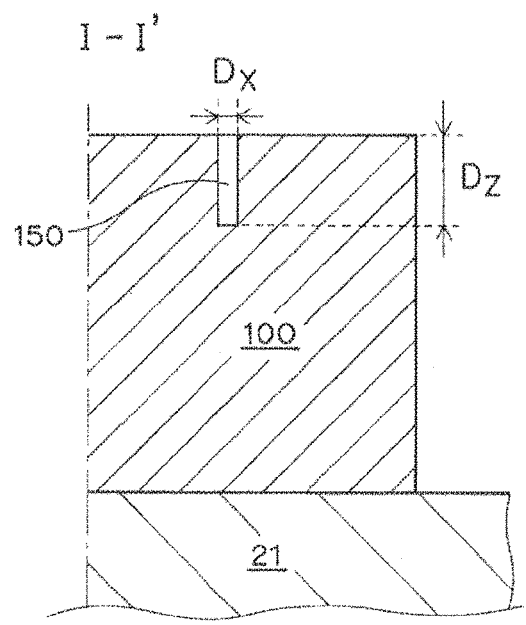
Figure 1:
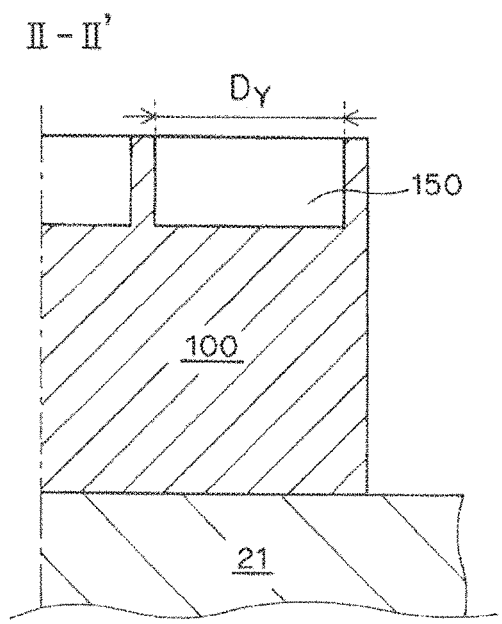

The manufacturing method according to an embodiment of the present invention will be described in more detail with reference to the accompanying drawings. It should be noted that forms/forms and dimensional proportions in the drawings are merely for illustrative purposes, and thus not the same as those of the actual parts or elements.

The term "powder layer" as used in this description and claims means a "metal powder layer made of a metal powder" or "resin powder layer made of a resin powder", for example. The term "predetermined portion of a powder layer" as used herein substantially means a portion of a three-dimensional shaped object to be manufactured. As such, a powder present in such predetermined portion is irradiated with a light beam, and thereby the powder undergoes a sintering or a melting and subsequent solidification to form a shape of a three-dimensional shaped object. Furthermore, the term "solidified layer" substantially means a "sintered layer" in a case where the powder layer is a metal powder layer, whereas term "solidified layer" substantially means a "cured layer" in a case where the powder layer is a resin powder layer.

The term "upward/downward" direction directly or indirectly described herein corresponds to a direction based on a positional relationship between the base plate and the three-dimensional shaped object. A side for manufacturing the three-dimensional shaped object is defined as the "upward direction", and a side opposed thereto is defined as the "downward direction" when using a position at which the base plate is provided as a standard.

[Selective Laser Sintering Method]

Figure 11A:
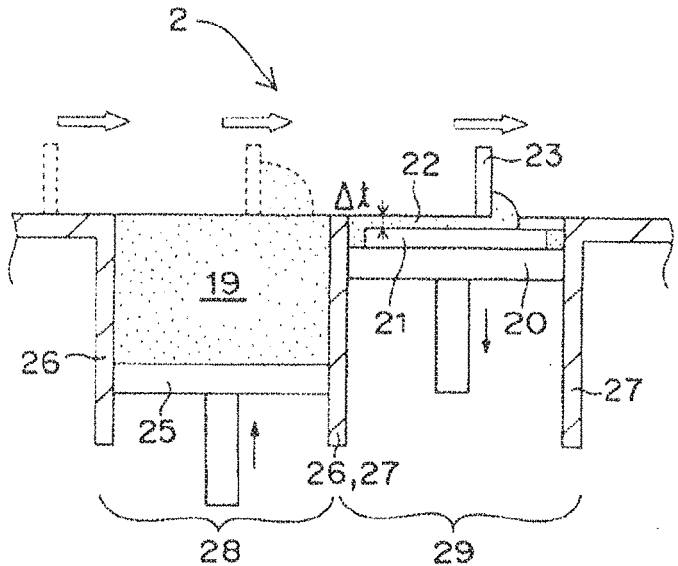
FIGS. 11A-11C are a cross-sectional view schematically illustrating a laser-sintering/machining hybrid process in accordance with the selective laser sintering method respectively.
Figure 11B:
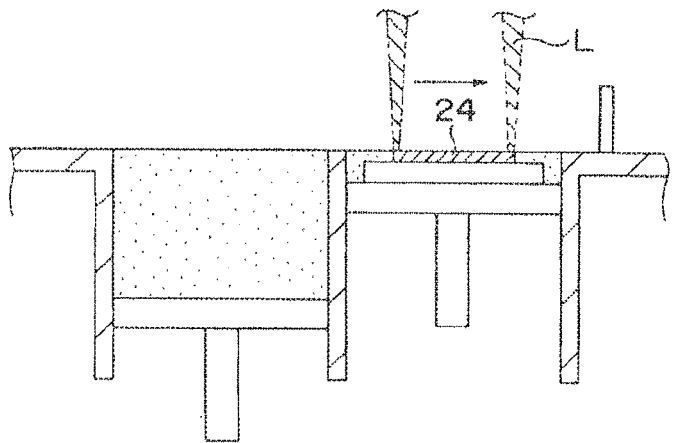
Figure 11C:
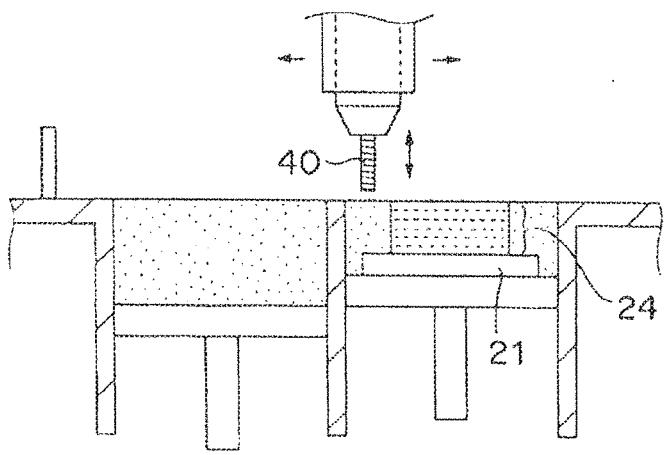
Figure 12:
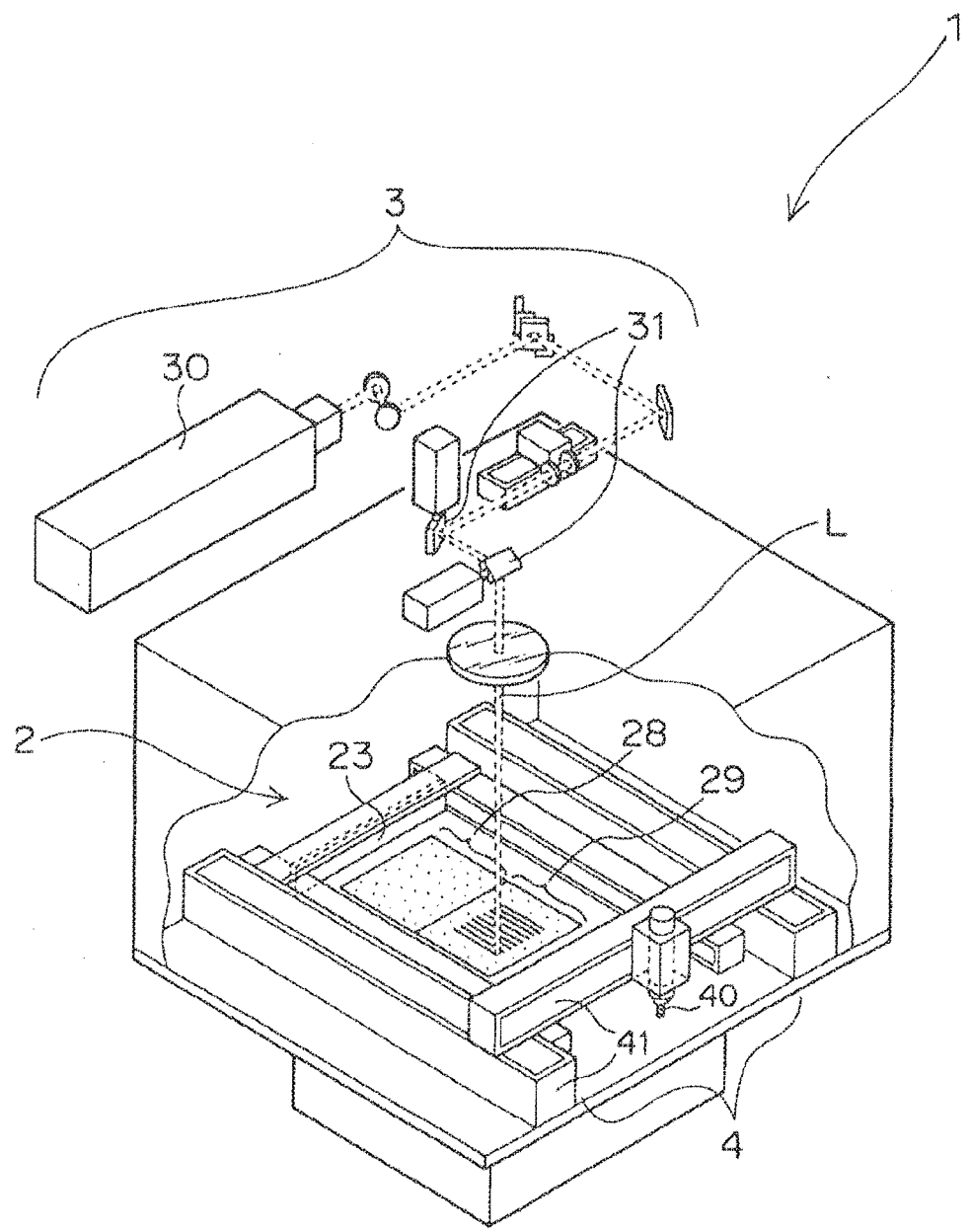
FIG. 12 is a perspective view schematically illustrating a construction of a laser-sintering/machining hybrid machine.
Figure 13:
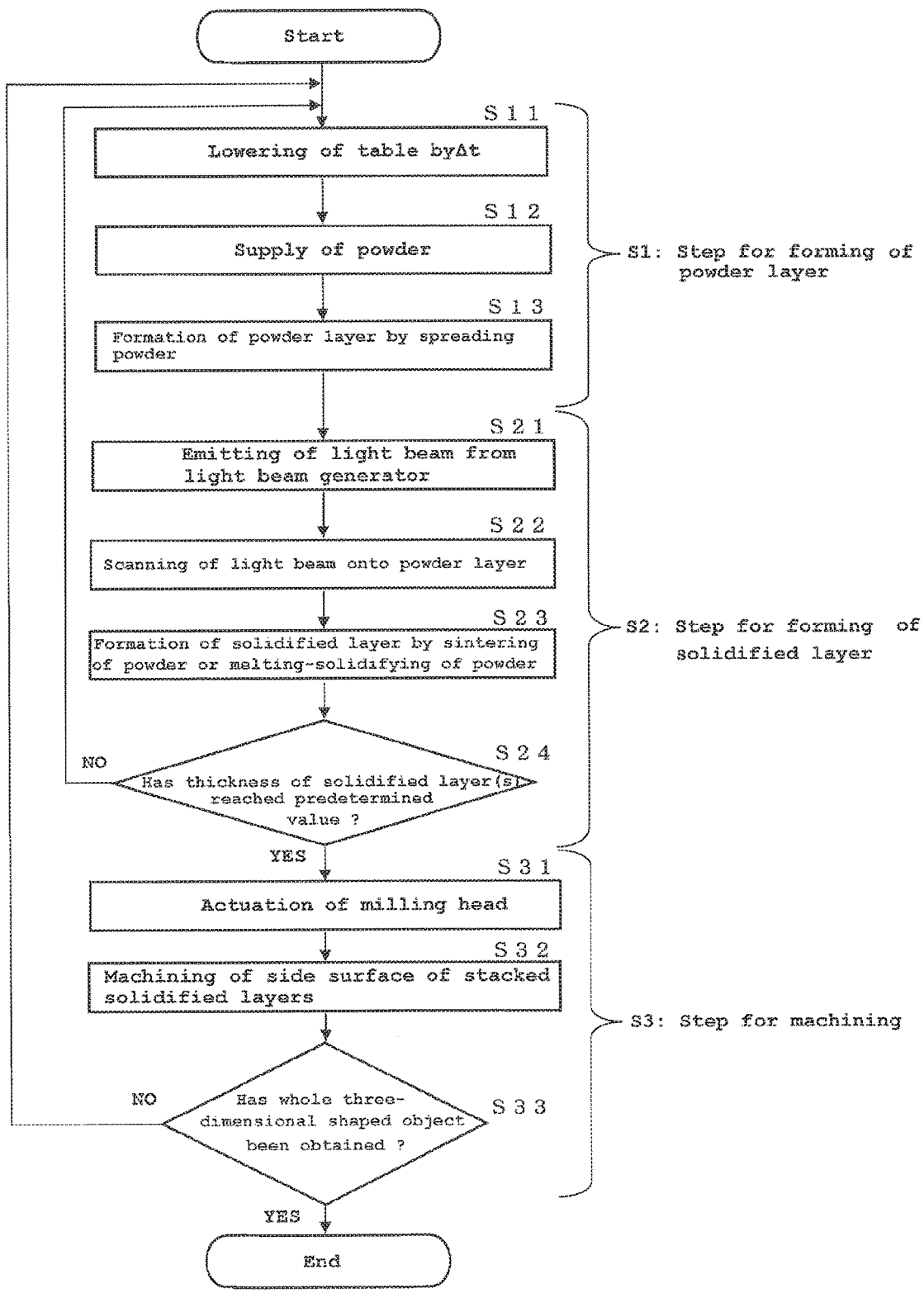
FIG. 13 is a flow chart of general operations of a laser-sintering/machining hybrid machine.

First of all, a selective laser sintering method, on which an embodiment of the manufacturing method of the present invention is based, will be described. By way of example, a laser-sintering/machining hybrid process wherein a machining is additionally carried out in the selective laser sintering method will be explained. FIGS. 11A-11C schematically show a process embodiment of the laser-sintering/machining hybrid. FIGS. 12 and 13 respectively show major constructions and operation flow regarding a metal laser sintering hybrid milling machine for enabling an execution of a machining process as well as the selective laser sintering method.

As shown in FIGS. 11A-11C and 12, the laser-sintering/milling hybrid machine 1 is provided with a powder layer former 2, a light-beam irradiator 3, and a machining means 4.

The powder layer former 2 is a means for forming a powder layer with its predetermined thickness through a supply of powder (e.g., a metal powder or a resin powder) as shown in FIGS. 11A-11C. The light-beam irradiator 3 is a means for irradiating a predetermined portion of the powder layer with a light beam "L". The machining means 4 is a means for milling the side surface of the stacked solidified layers, i.e., the surface of the three-dimensional shaped object.

As shown in FIGS. 11A-11C, the powder layer former 2 is mainly composed of a powder table 25, a squeegee blade 23, a forming table 20 and a base plate 21. The powder table 25 is a table capable of vertically elevating/descending in a "storage tank for powder material" 28 whose outer periphery is surrounded with a wall 26. The squeegee blade 23 is a blade capable of horizontally moving to spread a powder 19 from the powder table 25 onto the forming table 20, and thereby forming a powder layer 22. The forming table 20 is a table capable of vertically elevating/descending in a forming tank 29 whose outer periphery is surrounded with a wall 27. The base plate 21 is a plate for a shaped object. The base plate is disposed on the forming table 20 and serves as a platform of the three-dimensional shaped object.

As shown in FIG. 12, the light-beam irradiator 3 is mainly composed of a light beam generator 30 and a galvanometer mirror 31. The light beam generator 30 is a device for emitting a light beam "L". The galvanometer mirror 31 is a means for scanning an emitted light beam "L" onto the powder layer, i.e., a scan means of the light beam "L".

As shown in FIG. 12, the machining means 4 is mainly composed of a milling head 40 and an actuator 41. The milling head 40 is a cutting tool for milling the side surface of the stacked solidified layers, i.e., the surface of the three-dimensional shaped object. The actuator 41 is a means for driving the milling head 40 to move toward the position to be milled.

Operations of the laser sintering hybrid milling machine 1 will now be described in detail. As can been seen from the flowchart of FIG. 13, the operations of the laser sintering hybrid milling machine are mainly composed of a powder layer forming step (S1), a solidified layer forming step (S2), and a machining step (S3). The powder layer forming step (S1) is a step for forming the powder layer 22. In the powder layer forming step (S1), first, the forming table 20 is descended by Δt (S11), and thereby creating a level difference Δt between an upper surface of the base plate 21 and an upper-edge plane of the forming tank 29. Subsequently, the powder table 25 is elevated by Δt, and then the squeegee blade 23 is driven to move from the storage tank 28 to the forming tank 29 in the horizontal direction, as shown in FIG. 11A. This enables a powder 19 placed on the powder table 25 to be spread onto the base plate 21 (S12), while forming the powder layer 22 (S13). Examples of the powder for the powder layer include a "metal powder having a mean particle diameter of about 5 μm to 100 μm" and a "resin powder having a mean particle diameter of about 30 μm to 100 μm (e.g., a powder of nylon, polypropylene, ABS or the like". Following this step, the solidified layer forming step (S2) is performed. The solidified layer forming step (S2) is a step for forming a solidified layer 24 through the light beam irradiation. In the solidified layer forming step (S2), a light beam "L" is emitted from the light beam generator 30 (S21). The emitted light beam "L" is scanned onto a predetermined portion of the powder layer 22 by means of the galvanometer mirror 31 (S22). The scanned light beam can cause the powder in the predetermined portion of the powder layer to be sintered or be melted and subsequently solidified, resulting in a formation of the solidified layer 24 (S23), as shown in FIG. 11B. Examples of the light beam "L" include carbon dioxide gas laser, Nd:YAG laser, fiber laser, ultraviolet light, and the like.

The powder layer forming step (S1) and the solidified layer forming step (S2) are alternately repeated. This allows a plurality of the solidified layers 24 to be integrally stacked with each other, as shown in FIG. 11C.

When the thickness of the stacked solidified layers 24 reaches a predetermined value (S24), the machining step (S3) is initiated. The machining step (S3) is a step for milling the side surface of the stacked solidified layers 24, i.e., the surface of the three-dimensional shaped object. The milling head 40 (see FIG. 11C and FIG. 12) is actuated to initiate an execution of the machining step (S31). For example, in a case where the milling head 40 has an effective milling length of 3 mm, a machining can be performed with a milling depth of 3 mm. Therefore, supposing that "Δt" is 0.05 mm, the milling head 40 is actuated when the formation of the sixty solidified layers 24 is completed. Specifically, the side face of the stacked solidified layers 24 is subjected to the surface machining (S32) through a movement of the milling head 40 driven by the actuator 41. Subsequent to the surface machining step (S3), it is judged whether or not the whole three-dimensional shaped object has been obtained (S33). When the desired three-dimensional shaped object has not yet been obtained, the step returns to the powder layer forming step (S1). Thereafter, the steps S1 through S3 are repeatedly performed again wherein the further stacking of the solidified layers 24 and the further machining process therefor are similarly performed, which eventually leads to a provision of the desired three-dimensional shaped object.

[Manufacturing Method of the Present Invention]

A manufacturing method according to an embodiment of the present invention is characterized by features associated with a formation of the solidified layer in the selective laser sintering method as described above.

Specifically, a part of a region for a formation of the solidified layer is not irradiated with the light beam to form a non-irradiated portion, thereby providing at least one slit-groove at an upper surface of a three-dimensional shaped object. Specifically, "the non-irradiated portion which is not irradiated with the light beam and thus is not solidified" is locally provided in the region for the formation of the solidified layer (i.e., the region for manufacturing the three-dimensional shaped object) to form the slit-groove at the upper surface of the three-dimensional shaped object to be finally obtained.

FIG. 1 shows "the three-dimensional shaped object 100 with the slit-groove 150 at the upper surface 130 of the three-dimensional shaped object". As shown in FIG. 1, the slit-groove 150 has an elongated opening as a whole (i.e., "slit-opening"), and the slit-groove extends from the opening to an internal portion of the three-dimensional shaped object 100.

The "slit-groove" in an embodiment of the present invention means a groove with an elongated form as a whole. Specifically, the "slit-groove" has an elongated form cue to "slit", and also has a locally recessed form at the upper surface of the three-dimensional shaped object due to "groove". The term "slit" used to express the elongated form in the specification indicates a slit in which an aspect ratio (i.e., a ratio of its longer dimension (i.e., longitudinal dimension) to its shorter dimension) is approximately in the range of 3 to 100.

When the three-dimensional shaped object is provided with the slit-groove in accordance with the manufacturing method according to an embodiment of the present invention, the stress (especially "warp-stress") arising around the upper surface of the three-dimensional shaped object is reduced. Therefore, according to an embodiment of the present invention, the warp of the three-dimensional shaped object obtained by the selective laser sintering method can be reduced.

Figure 15:
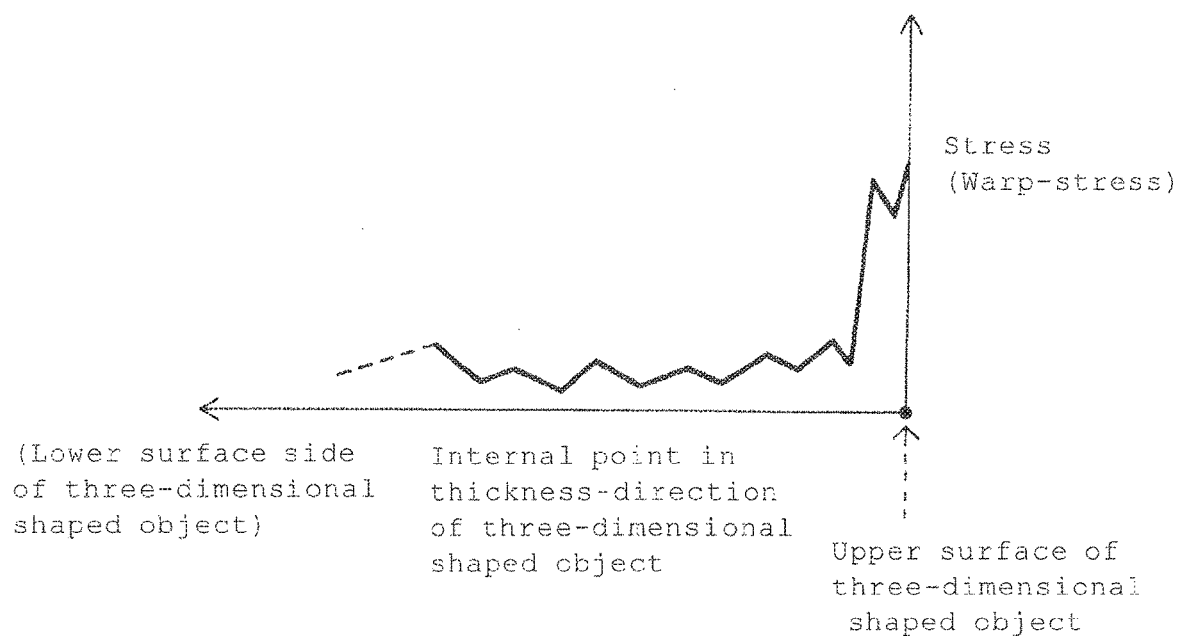
FIG. 15 is a graphic view schematically illustrating the phenomenon found by the inventors of the present application.

While not intending to be bound by any specific theory, it can be presumed that an existence of the slit-groove allows a portion at which the stress in the three-dimensional shaped object arises to be divided, and thus the remaining stress in the three-dimensional shaped object is reduced as a whole, which leads to the reduction of the warp of the three-dimensional shaped object. In this regard, a large stress may arise around the upper surface of the three-dimensional shaped object when conducting the selective laser sintering method as described above (see FIG. 15). According to an embodiment of the present invention, however, since the slit-groove is provided around the upper surface of the three-dimensional shaped object, the stress can be effectively reduced.

In light of such a characteristic function of the slit-groove, the slit-groove according to an embodiment of the present invention can be referred as "a slit-groove for reducing the stress of the three-dimensional shaped object".

In the manufacturing method according to an embodiment of the present invention, the slit-groove is provided at the upper surface of the three-dimensional shaped object. The phrase "upper surface" as used herein corresponds to a surface of the three-dimensional shaped object, the surface being positioned at "upside" in a case where the laminated direction of the solidified layer is defined as an "upward direction" and also an opposite direction to the laminated direction is defined as a "downward direction". Upon the forming of the uppermost solidified layer and at least one the solidified layer to be positioned at a downside of the uppermost solidified layer, a local region which is a part of the region for the formation of the solidified layer is not solidified to form the non-irradiated portion, and thus the slit-groove can be provided. Since the "non-irradiated portion" corresponds to a portion not irradiated with the light beam in "a region for manufacturing the three-dimensional shaped object", the region being provided in an area at which the powder layer is formed, "powders not composing the solidified layer" remain after being irradiated with the light beam. Finally, the remaining powders in the three-dimensional shaped object are removed to form the slit-groove.

According to an embodiment of the present invention, the number of the slit-groove is not limited to one. Specifically, a plurality of the slit-grooves may be provided at the upper surface of the three-dimensional shaped object. In such a case, it is preferable that the plurality of the slit-grooves have the regular arrangements. For example, as shown in FIG. 1, the plurality of the slit-grooves 150 may be provided such that they are arrayed as a whole at the upper surface 130 of the three-dimensional shaped object 100. The regular arrangement of the plurality of the slit-grooves 150 allows the stress arising upon the manufacturing of the three-dimensional shaped object to be more uniformly reduced. The plurality of the slit-grooves with the regular arrangement result from the "non-irradiated portions" with a regular arrangement, the "non-irradiated portions" being provided upon the forming of the uppermost solidified layer and at least one solidified layer to be positioned at the downside of the uppermost solidified layer.

The phrase "regular arrangement" as used herein means such an embodiment that the plurality of the slit-grooves are two-dimensionally arrayed or distributed in a periodic pattern at the upper surface of the three-dimensional shaped object. As an example, the plurality of the slit-grooves with the regular arrangement have a substantial constant distance between the slit-grooves being adjacent to each other in a direction, the distance corresponding to "spaced dimension" between two slit-grooves being adjacent to each other.

In view of not only an effective reduction of the stress arising upon the manufacturing of the three-dimensional shaped object, but also an adequate retainment of a structural strength of the three-dimensional shaped object, the slit groove with specific forms may be provided. Specifically, it is preferable that the slit-opening of the slit-groove 150 has a shorter dimension (i.e., "$D_x$" in FIG. 1) of 0.05 mm to 1 mm. The slit-opening with the shorter dimension of less than 0.05 mm is not likely to effect the reduction of the stress enough to prevent the warp of the three-dimensional shaped object. On the other hand, the slit-opening with the shorter dimension of more than 1 mm may cause an excess reduction of the structural strength of the three-dimensional shaped object. It is more preferable that the slit-opening has the shorter dimension of 0.05 mm to 0.5 mm.

Similarly, it is preferable that the slit-opening of the slit-groove 150 has a longer dimension (i.e., "$D_y$" in FIG. 1) of 1 mm to 30 mm. The slit-opening having the longer dimension of less than 1 mm is not likely to effect the reduction of the stress enough to prevent the warp of the three-dimensional shaped object. On the other hand, the slit-opening having the longer dimension of more than 30 mm may cause the excess reduction of the structural strength of the three-dimensional shaped object. It is more preferable that the slit-opening has the longer dimension of 5 mm to 10 mm.

The slot-groove with such a form can be provided by the adjustment of the shorter dimension and/or the longer dimension of the "non-irradiated portion" to the above described dimensions when forming the uppermost solidified layer and at least one solidified layer to be positioned at the downside of the uppermost solidified layer.

When a plane in which the laminated direction of solidified layer is a normal direction is regarded as a transverse plane, the phrase "slit-opening" as used herein substantially means the transverse plane of the slit-groove (i.e., the transverse plane of the slit-groove having a shape of a rectangle, which is referred as a "rectangular transverse plane" hereafter). Accordingly, the "shorter dimension of the slit-opening" substantially indicates a shorter dimension of the rectangular transverse plane for the slit-groove, and also the "longer dimension of the slit-opening" substantially indicates a longer dimension of the rectangular transverse plane for the slit-groove. The "shorter dimension" of the slit-opening in an embodiment of the present invention may conveniently correspond to a "shorter dimension" (i.e., "$D_x$" shown in FIG. 1) of the rectangular transverse plane at the upper surface-level of the three-dimensional shaped object. The "longer dimension" of the slit-opening in an embodiment of the present invention may conveniently correspond to a "longer dimension" (i.e., "$D_y$" shown in FIG. 11) of the rectangular transverse plane at the upper surface-level of the three-dimensional shaped object.

Furthermore, in the manufacturing method according to an embodiment of the present invention, it is preferable that the slit-groove 150 has a depth dimension of 10% to 50% with respect to a thickness dimension of the three-dimensional shaped object 100 (the depth dimension corresponding to "$D_z$" in FIG. 1). The slit-groove having its depth dimension of less than 10% with respect to the thickness dimension of the three-dimensional shaped object 100 is not likely to effect the reduction of the stress enough to prevent the warp of the three-dimensional shaped object. On the other hand, the slit-groove having its depth dimension of more than 50% with respect to the thickness dimension of the three-dimensional shaped object 100 may cause the excess reduction of the structural strength of the three-dimensional shaped object despite the fact that the slit-groove having such the depth dimension does not effect a significant reduction of the stress. Accordingly, it is more preferable that the slit-groove has the depth dimension of 10% to 40% with respect to the thickness dimension of the three-dimensional shaped object. It is still more preferable that the slit-groove has the depth dimension of 10% to 30% with respect to the thickness dimension of the three-dimensional shaped object. The phrase "thickness dimension of the three-dimensional shaped object" as used herein means a thickness dimension of the three-dimensional shaped object at a portion in which the slit-groove to be targeted is provided.

An adjustment for the number of the solidified layers in which the "non-irradiated portion" is provided allows the depth dimension of the slit-groove to be adjusted. Specifically, the depth dimension of the slit-groove can be adjusted by an adjustment of the number of "the uppermost solidified layer and the solidified layer to be positioned at the downside of the uppermost solidified layer" in which the "non-irradiated portion" is provided. Specifically, the increased number of the solidified layers in which the "non-irradiated portion" is provided allow the slit-groove having a relatively larger depth dimension to be formed. On the other hand, the decreased number of the solidified layers in which the "non-irradiated portion" is provided allows the slit-groove having a relatively smaller depth dimension to be formed.

Figure 2:
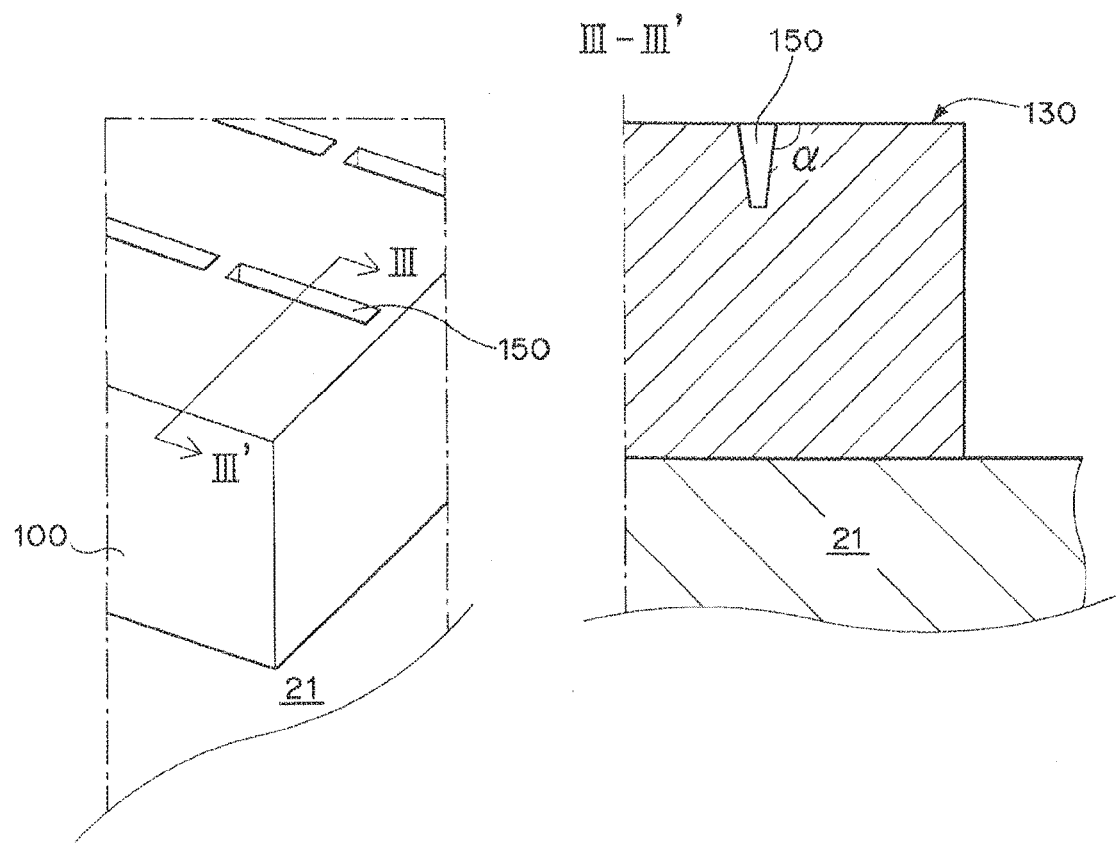
FIG. 2 is a perspective view and a cross-sectional view schematically illustrating a form of the three-dimensional shaped object obtained by the manufacturing method according to an embodiment of the present invention.

As described above, the slit groove can be configured in view of not only the reduction of the stress arising upon the manufacturing of the three-dimensional shaped object, but also the adequate retainment of the structural strength of the three-dimensional shaped object. Especially, the slit-groove may have the slit-opening with its shorter dimension gradually increasing to the upward direction. Specifically, as shown in FIG. 2, the slit-groove 150 may have a taper form such that it has the slit-opening with its shorter dimension gradually increasing from a bottom portion of the slit-groove to the upper surface 130 of the three-dimensional shaped object. The slit-groove with the taper form is based on such a technical idea that not only a necessary strength of the structure in the three-dimensional shaped object is possibly maintained but also the more portion at which the stress arises is removed. In the embodiment, the shorter dimension of the slit-opening is the largest at the upper surface-level of the three-dimensional shaped object, and it is the smallest at the bottom portion-level of the slit-groove. Since the large stress may arise around the upper surface of the three-dimensional shaped object, a volume of a region around the upper surface of the three-dimensional shaped object corresponding to the portion at which the stress arises is relatively more reduced, and however a reduction for a volume of a region which is distal to the upper surface is possibly prevented, which can lead to the maintenance of the necessary strength of the structure. It is preferable that the taper slit-groove 150 has a taper angle α of 100° to 150°, and it is more preferable that the taper slit-groove 150 has the taper angle α of 110° to 140°.

Upon the forming of the uppermost solidified layer and at least one solidified layer to be positioned at the downside of the uppermost solidified layer, the shorter dimension of the "non-irradiated portion" is gradually increased with the forming of the solidified layer to be positioned at an upper side of the formed solidified layer in order to form the taper slit-groove.

Figure 3:
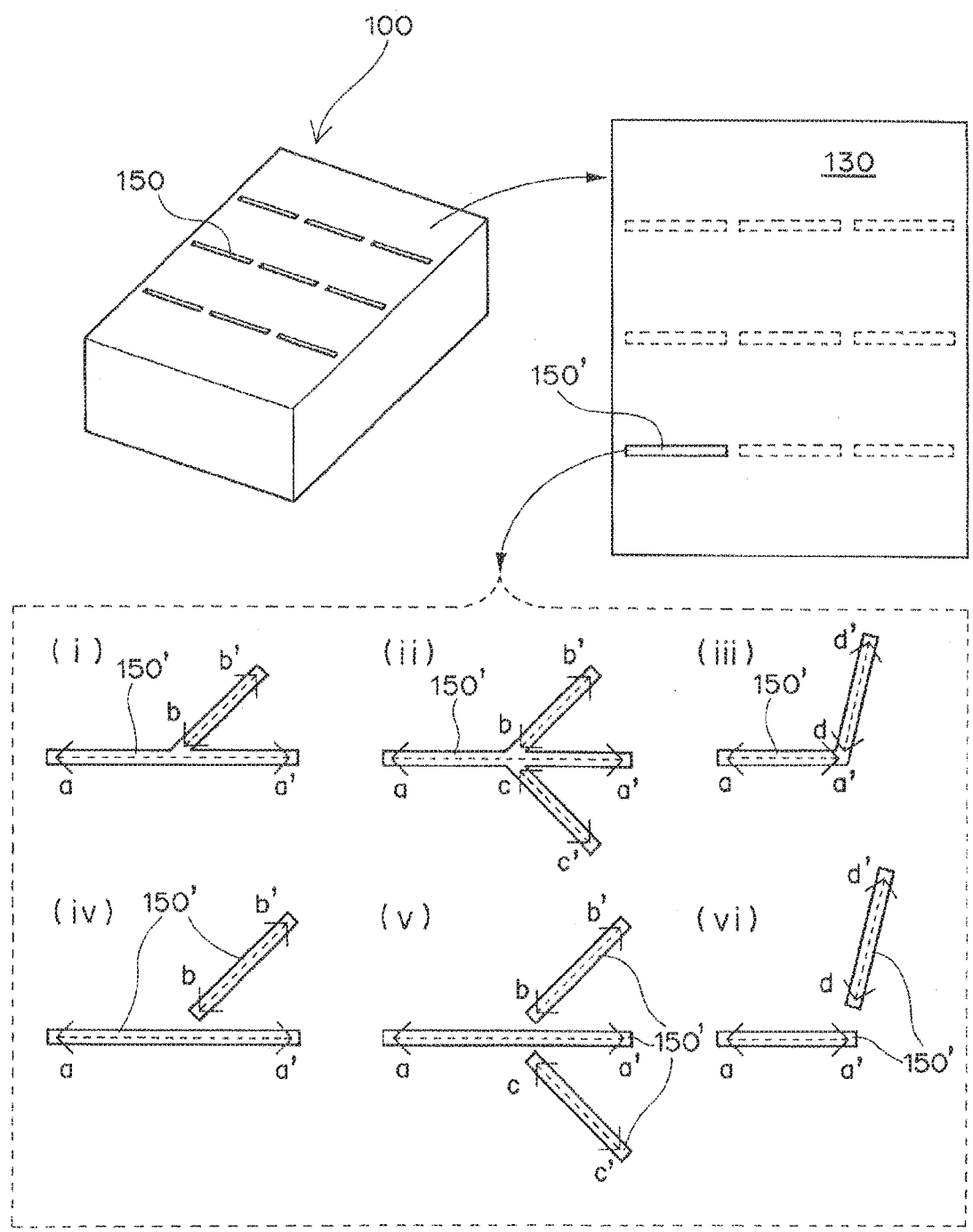
FIG. 3 is a schematic view for explaining a variety of forms of slit-opening.

In the manufacturing method according to an embodiment of the present invention, it is preferable that the slit-opening has a longer direction (i.e., longitudinal direction) which is in at least two orientations without being limited to a single orientation. Specifically, it is preferable that the slit-groove 150 is provided such that the slit-openings 150' has at least two elongate orientations while not being limited to a single elongate orientation as shown in FIGS. 3(i) to 3(vi). For example, in an embodiment shown in FIG. 3(i), the longer direction of the slit-opening 150' includes not only "orientation of a-a'" but also "orientation of b-b'". Similarly, in an embodiment shown in FIG. 3(ii), the longer direction of the slit-opening 150' includes not only "orientation of a-a'" but also "orientation of b-b'" and "orientation of c-c'". The phrase "orientation of x-x'" as used herein means "x orientation and x' orientation which is opposed to the x direction" included in the longer direction. In other words, the opening of the slit-groove has an elongate form along "x orientation and x' orientation opposed to the x direction".

"The slit-opening having the longer direction which is in at least two orientations" allows the stress arising in the three-dimensional shaped object to be more effectively reduced. More specifically, although it can be presumed that the warp-stress arising around the upper surface of the three-dimensional shaped object has a various orientations, the warp-stress can be effectively reduced due to the slit-opening having the longer direction which is in the at least two orientations.

FIG. 3(i) shows such an embodiment that a slit-opening 150' having the longer direction which is in the "orientation of b-b'" is provided such that it is branched from the slit-opening 150' having the longer direction which is in the "orientation of a-a'". FIG. 3(ii) shows such an embodiment that a slit-opening 150' having the longer direction which is in the "orientation of c-c'" is provided such that it is further branched from the slit-opening 150' having the longer direction oriented to "orientation of a-a'". The present invention is not limited to the branched embodiments, it may adopt an embodiment shown in FIG. 3(iii). Specifically, the present invention may adopt such an embodiment that a slit-opening 150' having the longer direction which is in an another orientation (for example "orientation of d-d'" as shown in FIG. 3(iii)) different from a predetermined orientation (for example "orientation of a-a'" as shown in FIG. 3(iii)) continuously extends to the slit-opening 150' having the longer direction which is in the predetermined orientation through its end portion.

FIGS. 3(i)-3(iii) show the embodiments that the slit-openings each having the longer direction which is in the different orientation from each other are in a connection with each other. However, the present invention is not necessarily limited to the embodiments shown in FIGS. 3(i)-3(iii). The present invention may adopt such an embodiment that the slit-openings are spaced apart from each other as shown in FIGS. 3(iv)-3(vi). More specifically, the slit-opening 150' having the longer direction which is in the "orientation of a-a'" may be spaced apart from the slit-opening 150' having the longer direction which is in the "orientation of b-b'" with each other as shown in FIG. 3(iv). The slit-opening 150' having the longer direction which is in the "orientation of c-c'" may be further spaced apart from not only the slit-opening 150' having the longer direction which is in the "orientation of a-a'" but also the slit-opening 150' having the longer direction which is in the "orientation of b-b'" as shown in FIG. 3(v). Similarly, as shown in FIG. 3(vi), the slit-opening 150' having its longer direction which is in the "orientation of a-a'" may be spaced apart from the slit-opening 150' having the longer direction which is in the "orientation of d-d'" with each other. It can be interpreted that FIGS. 3(iv)-3(vi) show that slit-grooves with different configurations with each other are provided, the slit-grooves having slit-openings with longer directions each of which is in the different orientations. Accordingly, a technical idea of "the slit-opening having the longer direction which is in at least two orientations" as used herein can be applied in not only such an embodiment that the slit-grooves are connected with each other but also such an embodiment that the slit-grooves are spaced apart from each other, in other words, the slit-grooves are separately provided.

Figure 4:
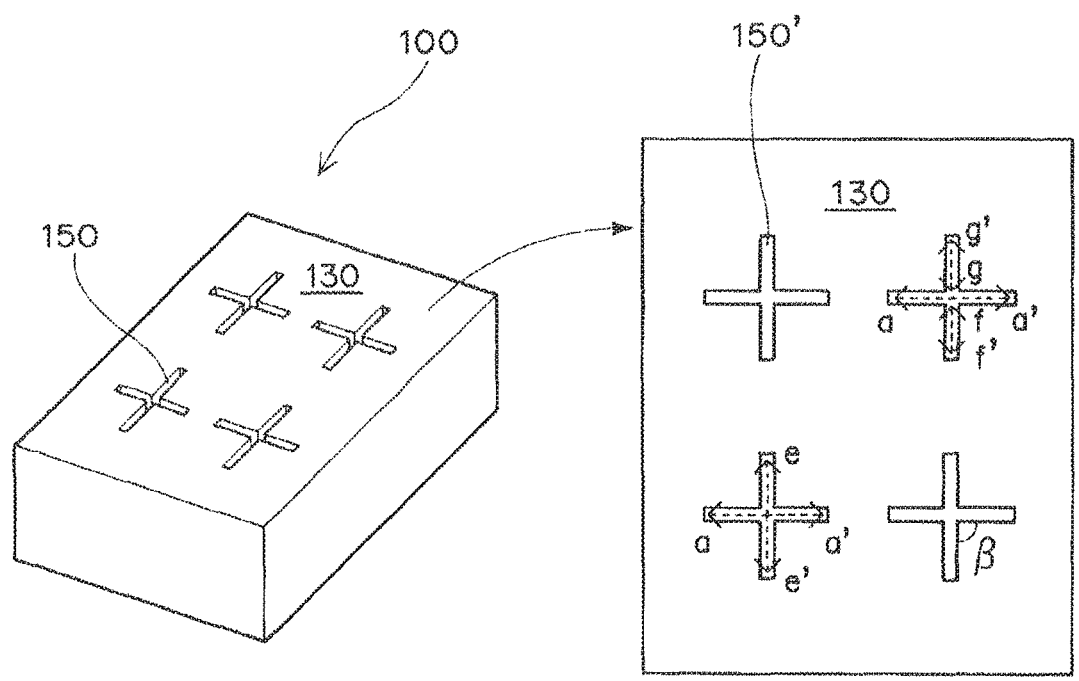
FIG. 4 is a schematic view for explaining the slit-openings having a shape of a cross.

An one preferable example of "the slit-opening having the longer direction which is in at least two orientations" includes slit-openings 150' having a shape of a cross as shown in FIG. 4. Specifically, as especially shown in a bottom left portion of a top plan view of FIG. 4, the slit-openings 150' is configured to intercross a slit-opening having its longer direction which is in the "orientation of a-a'" with a slit-opening having its longer direction which is in the "orientation of e-e'". The present invention has an advantageous effect in that "the shape of the cross" allows the stress to be more effectively reduced even if the stress having any orientations arises. Furthermore, it can be interpreted that the top plan view of FIG. 4 shows that a further slit-opening is provided, the further slit-opening being branched from the slit-opening having the longer direction which is in the "orientation of a-a'". Specifically, as shown in an upper right portion of the top plan view of FIG. 4, it can be interpreted that such a branch results in a further provision of a slit-opening having the longer direction which is in the "orientation of f-f'" and a slit-opening having the longer direction which is in the "orientation of g-g'".

As can be seen from FIG. 4, the phrase "the shape of the cross" as used herein means a shape of two slit-openings intercrossing at a same plane. FIG. 4 shows that the slit-opening having its longer direction which is in the "orientation of a-a'" intercrosses with the slit-opening having its longer direction which is in the "orientation of e-e'". However, such a cross angle is not especially limited. For example, the cross angle ("β" shown in FIG. 4) may be 90° Without being limited to the cross angle of 90°, the cross angle may be 45°≤β<90° or 90°<β≤135°.

Furthermore, "the slit-groove with the slit-opening having the longer direction which is in at least two orientations" results from the "non-irradiated portion" with the same form as that of the slit-groove upon the manufacturing of the three-dimensional shaped object. Specifically, the "non-irradiated portion" with a longer direction which is in at least two orientations is provided upon the forming of the uppermost solidified layer and at least one solidified layer to be positioned at the downside of the uppermost solidified layer.

Figure 5:
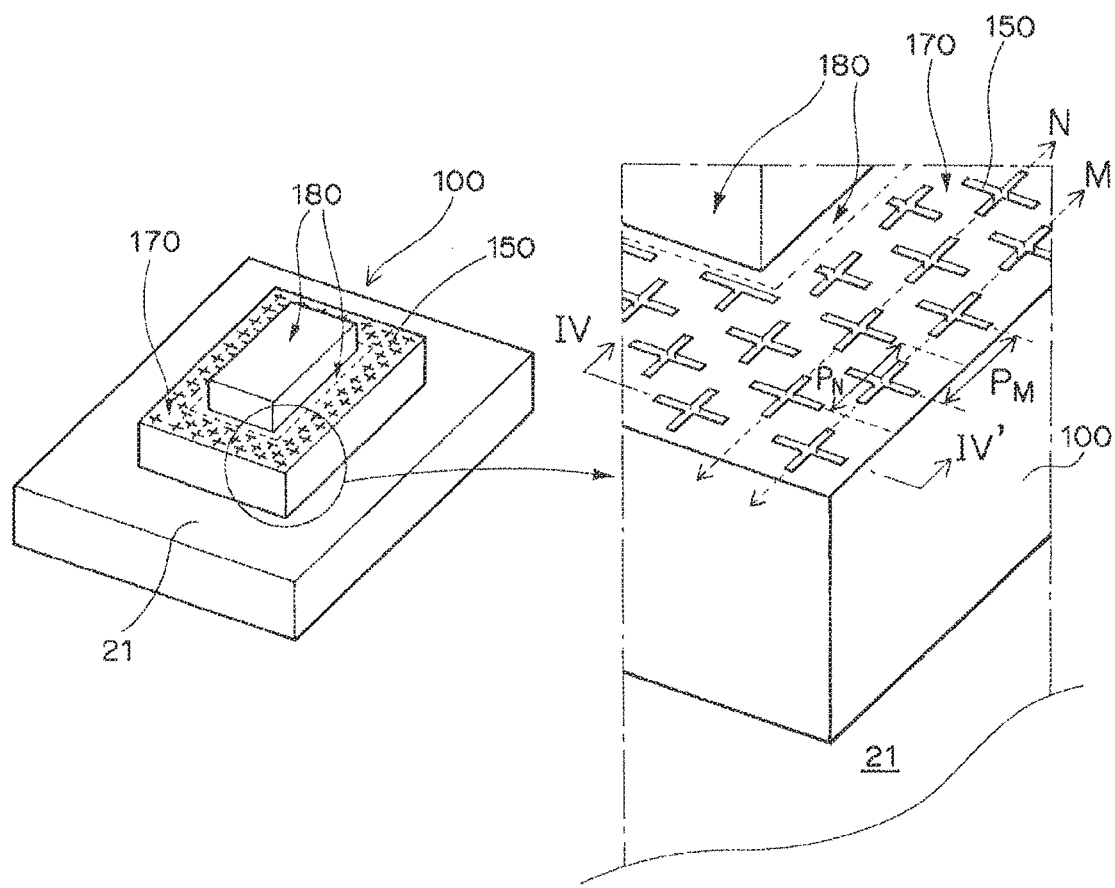
FIG. 5 is a perspective view and a cross-sectional view schematically illustrating a form of the three-dimensional shaped object used as a mold for a resin product.
Figure 5:
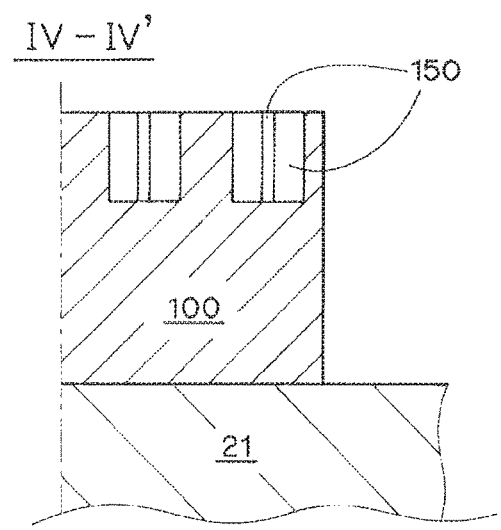

In the manufacturing method according to an embodiment of the present invention, the three-dimensional shaped object 100 used as a mold for a resin product can be manufactured. In such a case, it is preferable that the mold for the resin product has the slit-groove 150 at a parting-surface 170 as shown in FIG. 5 (FIG. 5 exemplificatively shows so-called "core side" of the mold for the resin product). The phrase "parting-surface" as used herein substantially means a surface at which one of the molds for the resin product is brought into a contact with the other of the molds for the resin product upon the actual molding, i.e., a "contact surface" between the molds.

As shown in FIG. 5, the parting-surface 170 is provided with the slit-groove 150. While on the other hand, a surface forming a cavity 180 (i.e., cavity-forming surface 180) is not provided with the slit-groove 150. Specifically, the slit-groove 150 is provided at the parting-surface 170 corresponding to the "contact surface" of the core side mold and/or cavity side mold for the resin product. However, the slit-groove 150 is not provided at the cavity-forming surface 180 corresponding to a "surface for forming a resin product". In such an embodiment, since the slit-groove 150 does not exist in the cavity-forming surface 180, a shape of the cavity-forming surface 180 is not damaged, which leads to a reduction of a stress arising in the mold for the resin product, i.e., a reduction of a warp of the mold for the resin product. Furthermore, since the slit-groove is merely provided at a part of the mold for the resin product such as the "parting-surface 170", a strength of a structure of the mold for the resin product is not largely reduced, which allows the warp of the mold for the resin product to be reduced.

As described above, the non-irradiated portion is provided upon the forming of "the uppermost solidified layer and at least one solidified layer to be positioned at the downside the uppermost solidified layer", and thus the slit-groove is formed. In such a case where the parting-surface is especially provided with the slit-groove, the solidified layer to be positioned at a level of the parting-surface may be regarded as the above "the uppermost solidified layer". Specifically, the non-irradiated portion is provided upon the forming of "the solidified layer to be positioned at the level of the parting-surface and at least one solidified layer to be positioned at the downside of the solidified layer to be positioned at the level of the parting-surface", which allows the slit-groove to be formed at the parting-surface.

As shown in FIG. 5, it is preferable that a plurality of the slit-grooves 150 have a regular arrangement at the parting-surface 170. Thus, it is possible to more uniformly reduce the stress arising in the mold for the resin product upon the manufacturing of the resin product.

Figure 6:
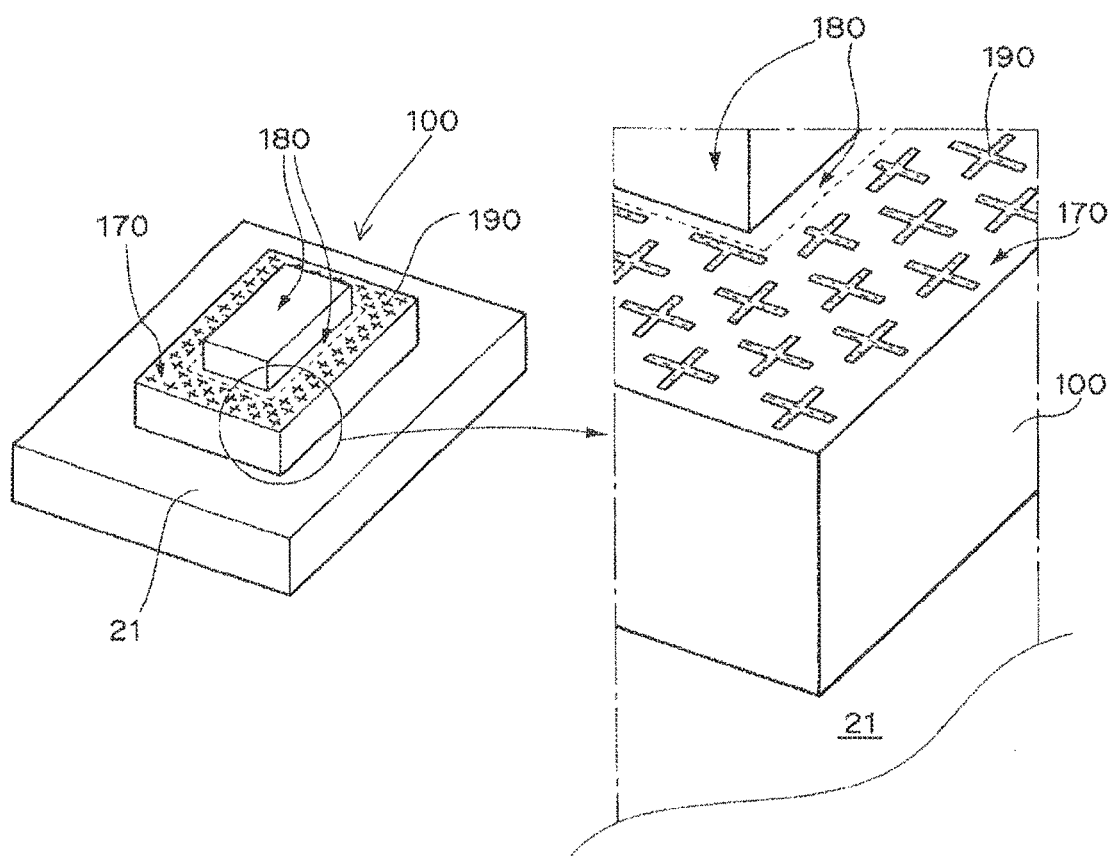
FIG. 6 is a perspective view schematically illustrating slit-grooves filled with a filling material.

In the manufacturing method according to an embodiment of the present invention, the slit-groove may be filled with a filling material 190 as shown in FIG. 6. By being filled with the filling material 190, the strength of the structure of the three-dimensional shaped object can be increased. A filling of the filling material 190 is preferable in view of not only the strength of the structure, but also a thermal conductive property of the three-dimensional shaped object (especially when it is used as the "mold for the resin product"). In this regard, when a metal material is used as the filling material 190, a thermal conductivity of the three-dimensional shaped object 100 can be increased. While on the other hand, when a resin material is used as the filling material 190, the thermal conductivity of the three-dimensional shaped object 100 can be decreased. The slit-grooves filled with the metal material may be combined with the slit-grooves filled with the resin material. In such a case, a desired thermal conductive property is likely to be provided by adjusting the number of "the slit-grooves filled with the metal material" and that of "the slit-grooves filled with the resin material" respectively.

The "metal material" used as the filling material 190 is preferably a metal with a low melting point, and it may be a solder and/or a zinc for example. While on the other hand, the "resin material" used as the filling material 190 is preferably thermal curable resins, and it may be at least one selected from the group of a phenolic resin, an urea resin, a melamine resin, an unsaturated polyester resin and an epoxy resin for example.

While not being limited to specific embodiments, the filling material having a fluidity can be provided in the slit-groove, followed by being solidified or cured, which allows the slit-groove to be filled with the filling material. For example, the metal material such as the metal with the low melting point is heated to be melted, and the melted metal material is provided in the slit-groove, followed by being subjected to a cooling to be solidified, which allows the slit-groove to be filled with the metal material. Furthermore, when using the resin material such as the thermal curable resin, a non-cured resin material or a partially cured resin material is provided in the slit-groove, followed by being subjected to a thermal treatment or a treatment with a light for example to be cured, which allows the slit-groove to be filled with the resin material. In order to preferably provide the filling material into the slit-groove, "a mask for locally exposing only the slit-groove" may be used, and the filling material may be provided into the slit-groove by the mask.

While describing the above exemplary embodiments for the understanding of the present invention, a variety of specific embodiments are adopted in the manufacturing method according to an embodiment of the present invention.

For example, upon the forming of the solidified layer of a high-density portion and a low-density portion, it is more preferable to provide the slit-groove at a region corresponding to the high-density portion. Since it can be presumed that a larger stress upon the manufacturing of the three-dimensional shaped object arises at the high-density portion, a provision of the slit-groove at the high-density portion allows an effective reduction of the stress. For example, when forming the solidified layer of "the high-density portion with its solidified density of 95 to 100%" and "the low-density portion with its solidified density of 0 to 95% (excluding 95%)", it is preferable to at least provide the slit-groove at the high-density portion with its solidified density of 95 to 100%. Specifically, with respect to the slit-groove provided at the upper surface of the three-dimensional shaped object, it is preferable that at least a portion of the slit-groove is provided in the high-density portion (with its solidified density of 95 to 100%). The phrase "solidified density (%)" as used herein substantially means a solidified sectional density (an occupation-ratio of a solidified material) determined by an image processing of a sectional photograph of the three-dimensional shaped object. Image processing software for determining the solidified sectional density is Scion Image ver. 4.0.2 (freeware made by Scion). In such case, it is possible to determine a solidified sectional density $\rho_s$ from the below-mentioned equation 1 by binarizing a sectional image into a solidified portion (white) and a vacancy portion (black), and then counting all picture element numbers $Px_{all}$ of the image and picture element number $Px_{white}$ of the solidified portion (white).

$$\rho_S = \frac{Px_{white}}{Px_{all}} \times 100(\%) \qquad \text{[Equation 1]}$$

Figure 7:
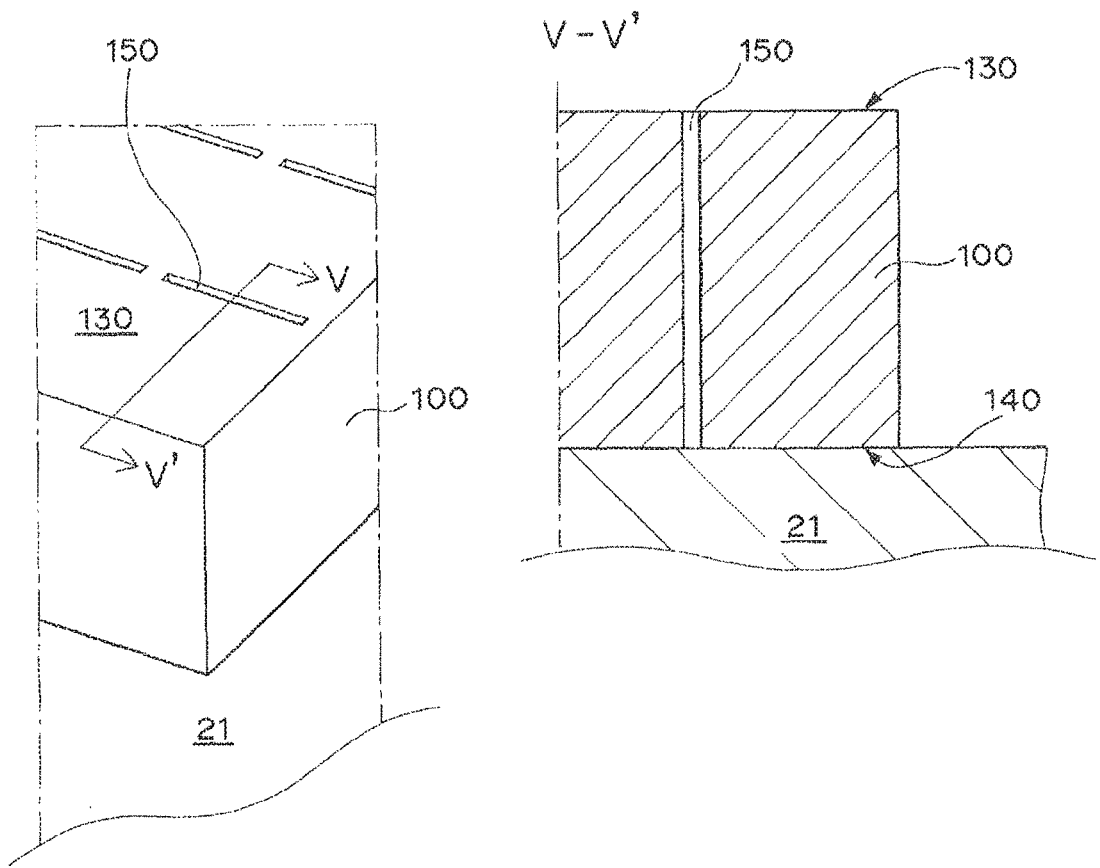
FIG. 7 is a perspective view and a cross-sectional view schematically illustrating a slit-groove with a larger depth.

Furthermore, in the manufacturing method according to an embodiment of the present invention, the slit-groove may have the depth dimension of more than 50% with respect to the thickness dimension of the three-dimensional shaped object. For example, as shown in FIG. 7, a slit-groove 150 with a larger depth may be provided such that the slit-groove extends to an interface 140 between the three-dimensional shaped object 100 and the base plate 21. In this regard, since it can be presumed that the stress may arise around the interface between the three-dimensional shaped object 100 and the base plate 21, a provision of the slit-groove 150 allows the stress around the interface to be reduced. Since the base plate 21 integrated with the three-dimensional shaped object 100 is a rigid body of such as a rigid material, the base plate 21 does not contribute to the occurrence of the shrinkage-phenomenon upon the manufacturing of the three-dimensional shaped object although the shrinkage-phenomenon occurs upon the forming of the solidified layer. Thus, it can be presumed that the stress may arise around the interface between the three-dimensional shaped object 100 and the base plate 21. Since the stress around the interface is relatively large one arising due to the base plate, it can be presumed that a certain amount of stress may remain around the interface even if the stress is relieved as described above.

Figure 8A:
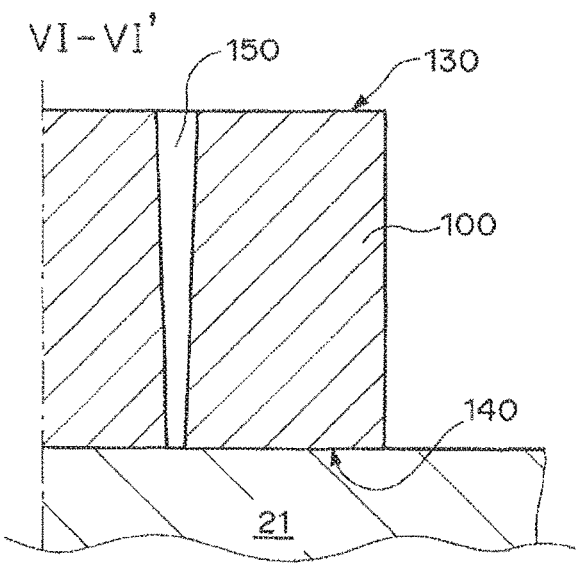
FIGS. 8A and 8B are a perspective view and a cross-sectional view schematically illustrating a taper slit-groove with a larger depth respectively.
Figure 8A:
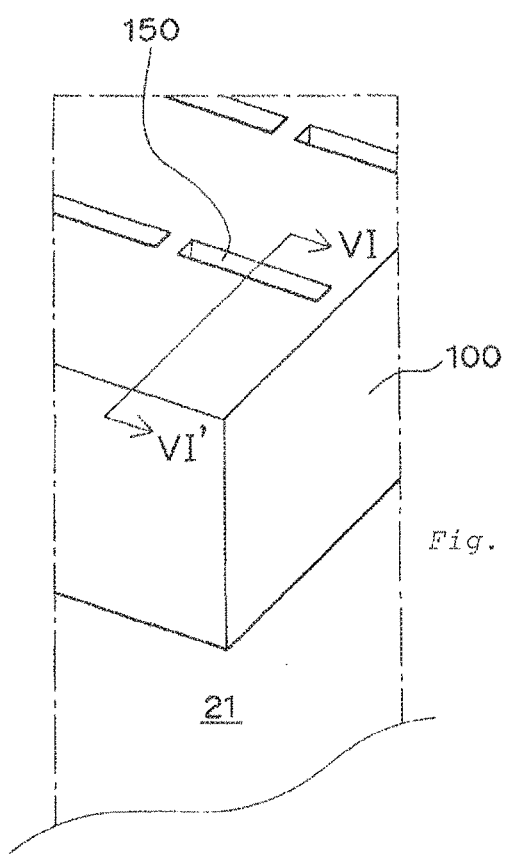
Figure 8B:
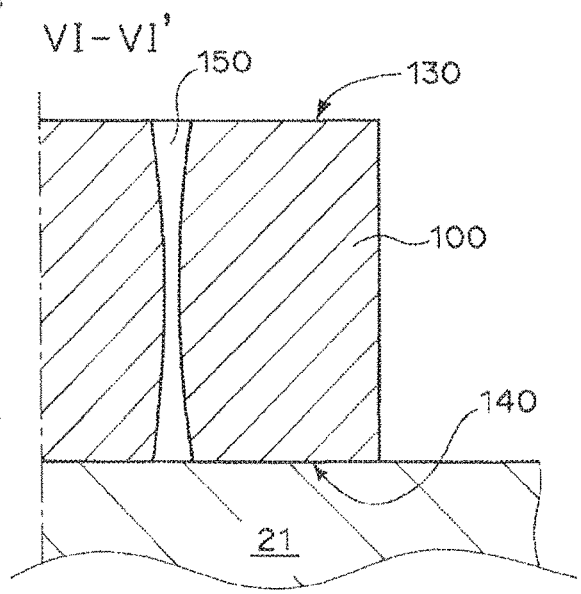

In a case where the slit-groove 150 with the larger depth extending to the interface between the three-dimensional shaped object and the base plate is provided, the slit-groove 150 may have the slit-opening with a constant shorter dimension as shown in FIG. 7. In another embodiment, the taper slit-groove with the larger depth may be provided as described above in reference to FIG. 2. Specifically, as shown in FIG. 8A, the slit-groove 150 may be provided such that it has the slit-opening with its shorter dimension gradually increasing from the interface 140 between the three-dimensional shaped object 100 and the base plate 21 to the upper surface 130 of the three-dimensional shaped object 100. Furthermore, if more effective reduction of the stress arising around the interface between the three-dimensional shaped object 100 and the base plate 21 is especially emphasized, the slit-groove 150 may be provided such that it has the slit-opening with its shorter dimension gradually increasing with respect to both an upper-side direction and a down-side direction as shown in FIG. 8B. Specifically, the shorter dimension of the slit-opening may gradually increase from an internal portion of the three-dimensional shaped object 100 to the upper surface 130 of the three-dimensional shaped object 100. Additionally, the shorter dimension of the slit-opening may gradually increase in a direction opposite to a direction extending from the internal portion to the upper surface 130, and may gradually increase from the internal portion of the three-dimensional shaped object 100 to the interface 140 between the three-dimensional shaped object 100 and the base plate 21.

Figure 9A:
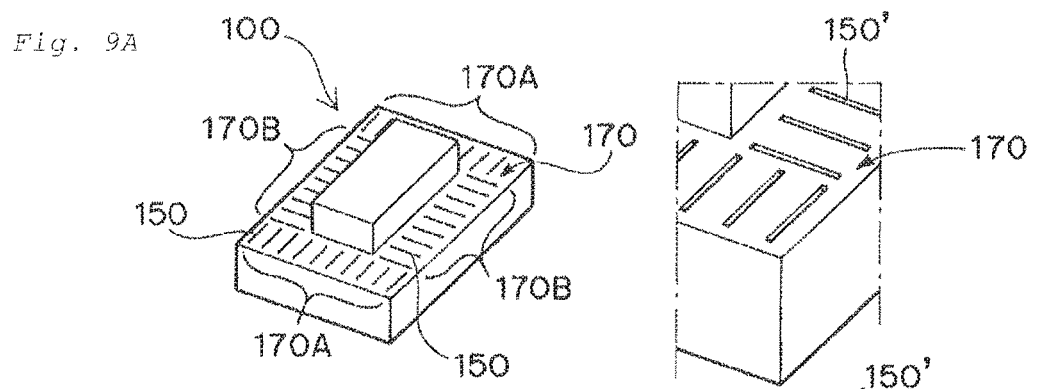
FIGS. 9A-9D are a perspective view schematically illustrating a variety of arrangements of slit-grooves respectively.
Figure 9B:
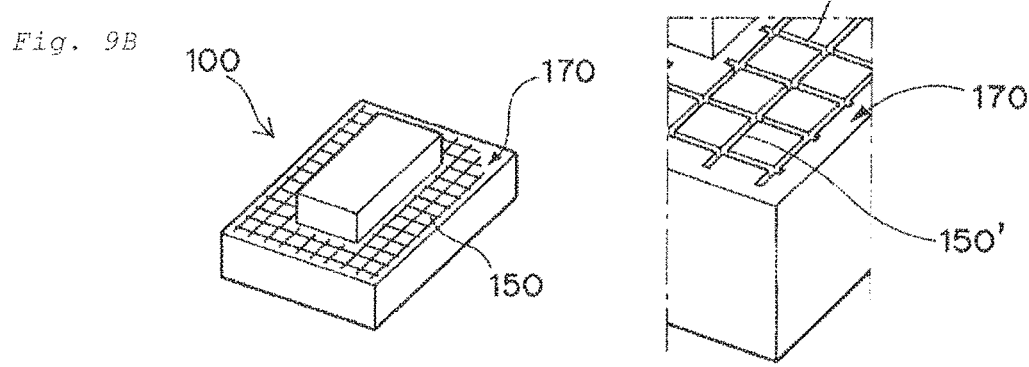
Figure 9C:
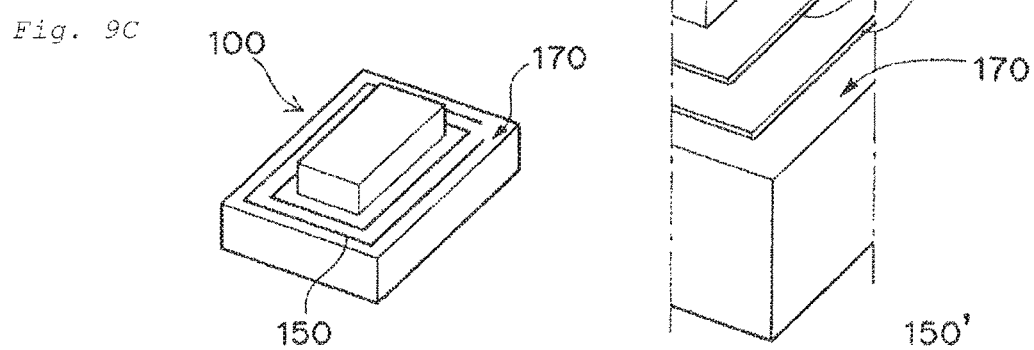
Figure 9D:
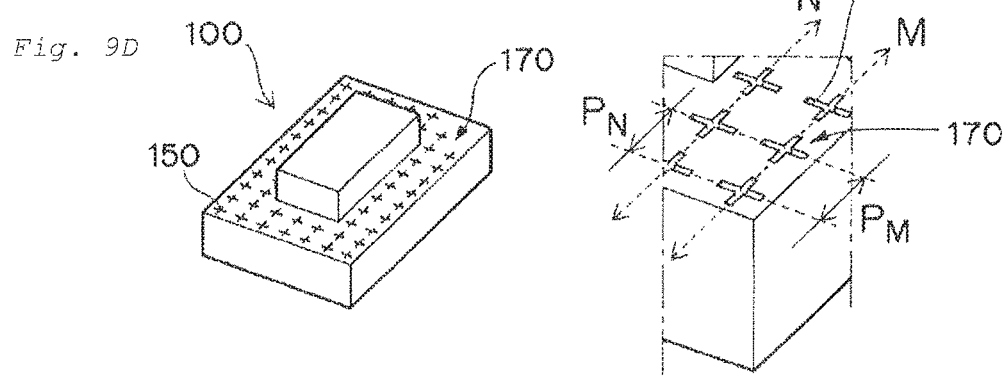

A plurality of the slit-grooves provided in the three-dimensional shaped object may have a variety of arrangements. Especially, when using the three-dimensional shaped object 100 as the mold for the resin product, such an embodiment that the parting-surface 170 is provided with a plurality of the slit-grooves 150 are not limited to that shown in FIG. 5. For example, such the embodiment that the parting-surface 170 is provided with the plurality of the slit-grooves 150 may be that shown in FIGS. 9A-9D. FIG. 9A shows an embodiment that a plurality of the slit-grooves 150 uniformly extend to an outer periphery of the parting-surface 170. When the parting-surface 170 is seen as a whole, the slit-groove 150 at "A" region 170A and the slit-groove 150 at "B" region 170B are positioned respectively such that an angle between "the longer direction of the slit-opening of the slit-groove 150 at "A" region 170A" and "that of the slit-groove 150 at "B" region 170B" forms 90°. FIG. 9B shows an embodiment that a plurality of the slit-grooves 150 intercrosses such that their slit-openings 150' have a shape of a grid as a whole. Each of the slit-openings 150' oriented to a predetermined longer direction crosses with a plurality of other slit-openings 150' oriented to a longer direction perpendicular to the predetermined longer direction. FIG. 9C shows an embodiment that each of the slit-grooves 150 has a circular arrangement at the parting-surface 170. More specifically, a plurality of the slit-grooves 150 are provided such that their slit-openings 150' with a continuous circular arrangement are spaced apart from each other. FIG. 9D shows an embodiment that a plurality of the slit-openings 150' with a shape of a cross are uniformly distributed. FIG. 9D shows an embodiment of the slit-opening 150' with the shape of the cross which is common to that of FIG. 5. However, it shows the slit-groove 150 with an arrangement which is different from that of FIG. 5. Specifically, FIG. 9D shows a consistency-embodiment between a pitch $P_M$ in a row M in the slit-openings and a pitch $P_N$ in another row N of the slit-openings placed in parallel with the row M. While on the other hand, FIG. 5 shows an inconsistency-embodiment (i.e., an oblique embodiment) between the pitch $P_M$ in the row M of the slit-openings and the pitch $P_N$ in the row N of the slit-openings. More specifically, FIG. 5 shows that the slit-openings have an oblique misalignment "by a half of pitch" between the slit-openings in one of adjacent rows and the slit-openings in other of the adjacent rows along the axis of the row of the slit-openings.

FIGS. 9A-9D show such an embodiment that the slit-openings have at least two longer directions without being limited to a single longer direction. In such the embodiment, it is possible to more effectively reduce the stress arising in the three-dimensional shaped object 100.

[Three-Dimensional Shaped Object of the Present Invention]

A three-dimensional shaped object according to an embodiment of the present invention is obtained by the above manufacturing method. Accordingly, the three-dimensional shaped object according to an embodiment of the present invention is made of the layered solidified layers formed by irradiating the powder layer with the light beam, wherein at least one slit-groove is provided at the upper surface of the three-dimensional shaped object, the slit-groove being is for reducing the stress in the three-dimensional shaped object. A provision of the slit-groove results in a reduction of the stress remaining in the three-dimensional shaped object (hereinafter called "residual stress"), which contributes to the prevention of the warp of the three-dimensional shaped object.

The three-dimensional shaped object according to an embodiment of the present invention is integrated with the base plate on which it is positioned by the above manufacturing method. Accordingly, as shown in FIG. 1, the three-dimensional shaped object 100 is configured such that its lower surface adheres to the base plate 21.

With respect to the three-dimensional shaped object according to an embodiment of the present invention, the phrase "slit-groove for reducing the stress" means a slit-groove for reducing the stress arising around the upper surface of the three-dimensional shaped object upon the manufacturing of the three-dimensional shaped object. As described above, the "slit-groove" has the elongated form due to "slit", and also has the locally recessed form at the upper surface of the three-dimensional shaped object due to "groove", the "slit" indicating a slit in which the aspect ratio is in the range of 3 to 100 for example.

It is preferable that a plurality of the slit-grooves 150 are provided, and it is more preferable that they have a regular arrangement at the upper surface 130 of the three-dimensional shaped object 100. Specifically, it is preferable that the plurality of the slit-grooves 150 are two-dimensionally arrayed or distributed in a periodic pattern at the upper surface 130 of the three-dimensional shaped object 100 as shown in FIGS. 1 and 4 for example. Due to such the regular arrangement of the plurality of the slit-grooves 150, the three-dimensional shaped object 100 has the more uniformly reduced residual stress, which leads to a more effective prevention of the warp of the three-dimensional shaped object.

The three-dimensional shaped object 100 can be used as the mold for the resin product (FIGS. 5 and 9A-9D). The phrase "resin-molding" as used herein means a general molding for forming the resin product, and also includes an injection-molding, an extrusion-molding, a compression-molding, a transfer-molding, or a blow-molding for example. FIGS. 5 and 9A-9D show a so-called "core side" mold for the resin product, however the three-dimensional shaped object 100 according to an embodiment of the present invention can be used as a "cavity side" mold for the resin product. When using the three-dimensional shaped object as the mold for the resin product, it is preferable that the mold for the resin product has the slit-groove at the parting-surface of the mold for the resin product. Specifically, it is preferable that the mold for the resin product has the slit-groove 150 at the parting-surface 170 (i.e., "contacted surface" between the molds), however, the mold for the resin product does not have the slit-groove 150 at the cavity-forming surface 180.

As shown in FIG. 6, the three-dimensional shaped object 100 may have the slit-groove filled with the filling material 190 in view of not only the strength of the structure but also the thermal conductive property of the three-dimensional shaped object. Specifically, as described above, the slit-groove may be filled with the metal material and/or the resin material as the filling material 190. In this case, an upper surface of the filling material in the slit-groove and the upper surface of the three-dimensional shaped object may be substantially flush with each other.

A variety of specific features of the three-dimensional shaped object, and a variety of effects associated with the variety of specific features have been described in the above [manufacturing method of the present invention]. Thus, the explanation for them is omitted to prevent redundant descriptions.

The slit-groove in the three-dimensional shaped object according to an embodiment of the present invention results in not only the "prevention of the warp of the three-dimensional shaped object", but also other preferable effects. Such other preferable effects are described as follows.

Specifically, when using the three-dimensional shaped object as the mold for the resin product, the slit-groove at the parting-surface can serve as a gas-vent in a resin-molding process (the phrase "the gas-vent" as used herein may be called "a passage for releasing a gas" by the skilled person). When the resin material is injected into a cavity-space in the mold for the resin product in the molding process (e.g. the injection-molding process), an air existing in the cavity-space is replaced with the resin material, and thus the air in the cavity-space is discharged to an outside of the cavity-space. The slit-groove can be used as a space for receiving the discharged air. When describing it in detail, the so-called the "core side" and "cavity side" molds for the resin product are clamped with each other in the molding process with the mold for the resin product, and thus the parting-surface of the core side and that of the cavity side are brought into a contact with each other. However, a gap through which the air can pass is microscopically formed between the parting-surface of the core side and that of the cavity side. Accordingly, when the resin material is injected into the cavity-space in the molds for the resin-molding clamped with each other, the air in cavity-space can flow through the microscopic gap to slit-groove which can serve as the gas-vent. Furthermore, although the air originally exists in the slit-groove, the air in the cavity-space is pressurized upon the injection of the resin material into the cavity-space, which forces the air in the cavity-space to be entered into the slit-groove.

When using the three-dimensional shaped object as the mold for the resin product, it is generally considered that a passage for releasing the air is formed at the cavity-forming surface, the passage being of the low-density portion, and the passage is used as the gas-vent. However, in this case, the resin molded product with a rough surface may be formed due to the low-density portion, i.e., a "non-dense portion". In this regard, the three-dimensional shaped object according to an embodiment of the present invention has the slit-groove at not the cavity-forming surface but the parting-surface, which contributes to a prevention of the forming of the resin molded product with a non-desired rough surface.

Figure 14A:
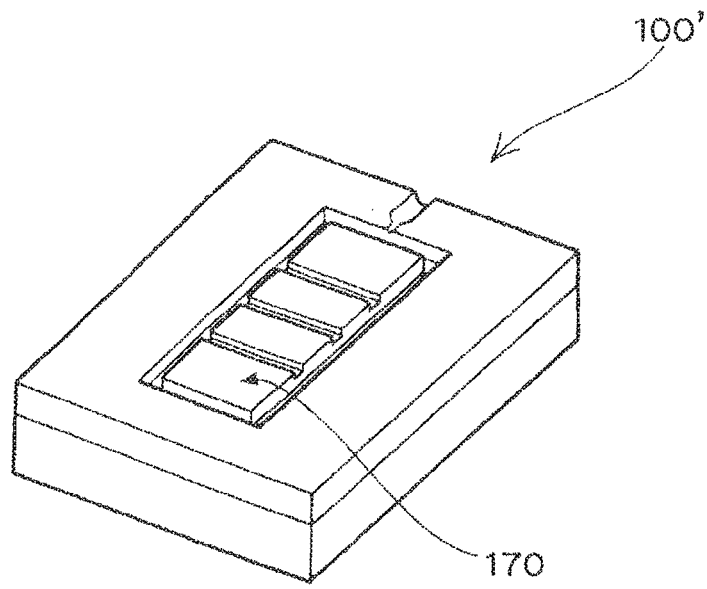
FIG. 14A is a perspective view schematically illustrating a conventional mold for the resin product.
Figure 14B:
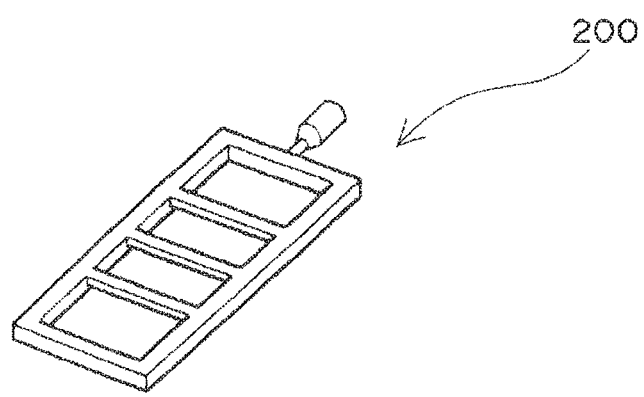
FIG. 14B is a perspective view schematically illustrating a resin product obtained by the conventional mold.

Further specific embodiments regarding the slit-groove serving as the gas-vent in the resin molding process are described with reference to FIGS. 10 and 14A. FIG. 14A shows a conventional mold for the resin product 100' (especially core side mold). FIG. 14B shows a resin molded product 200 obtained by the conventional mold. As can be seen from FIGS. 10 and 14A, a portion indicated by the reference numeral "170" in the mold for the resin product 100' shown in FIG. 14A corresponds to the parting surface (more accurately "a part of the parting surface").

Figure 10:
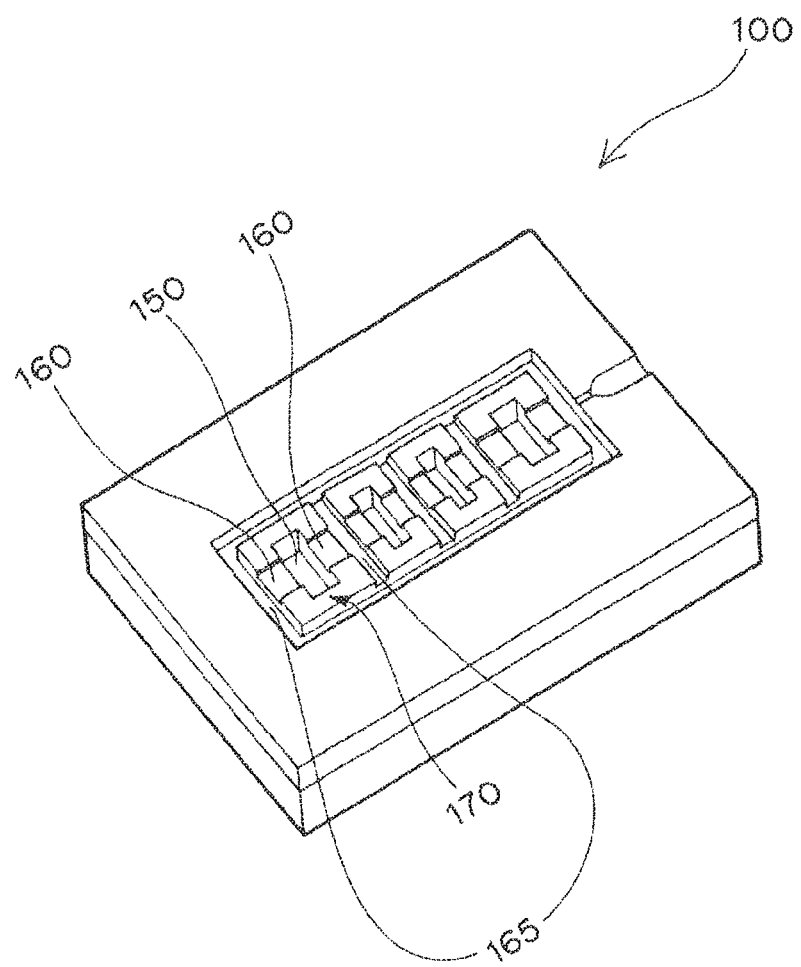
FIG. 10 is a perspective view schematically illustrating a specific form of the three dimensional shaped-object used as the mold for the resin product.

While on the other hand, FIG. 10 shows the three-dimensional shaped object 100 according to an embodiment of the present invention used as the mold for the resin product. In the mold for the resin product shown in FIG. 10, it has the slit-groove 150 at the portion corresponding to the parting-surface 170. The use of the mold for the resin product shown in FIG. 10 allows the resin product 200 shown in FIG. 14B to be obtained. Additionally, since the slit-groove 150 can serve as the gas-vent in the resin molding process, more preferable mold for the resin product can be provided. Furthermore, the mold for the resin product shown in FIG. 10 has "a groove for flowing the gas 160", the groove 160 being configured to be in a communication with the slit-groove 150 at a point in time after the clamping, which can be likely to discharge the air in the cavity-space to the slit-groove 150 upon the injection of the resin material into the cavity-space. It is preferable that the groove for flowing the gas 160 has a slight recessed form with respect to the parting-surface 170, and the groove 160 is positioned between the cavity-space 165 and the slit-groove 150 such that the groove 16C continuously connects the cavity-space 165 and the slit-groove 150 as shown in FIG. 10.

Although some embodiments of the present invention have been hereinbefore described, these are merely typical examples in the scope of the present invention. Accordingly, the present invention is not limited to the above embodiments. It will be readily appreciated by the skilled person that various modifications/additional embodiments are possible without departing from the scope of the present invention.

For example, the manufacturing method of the present invention can be applied to not only the selective laser sintering method with the additional machining process (see FIGS. 11 and 12) but also that with no machining process.

It has been described that the slit-groove has the slit-opening with the shape of the angular rectangle, however, the present invention is not limited to the embodiment. The slit-groove may have the slit-opening with a shape of a non-angular rectangle or a round as a whole.

Furthermore, it has been described that the taper slit-groove has the slit-opening with its shorter dimension gradually increasing to the upper direction. Similarly, the taper slit-groove may have the slit-opening with its longer dimension gradually increasing to the upper direction. Specifically, the taper slit-groove may be provided such that it has the slit-opening with its longer dimension gradually increasing from the bottom portion of the slit-groove to the upper surface of the three-dimensional object.

It should be noted that the present invention as described above includes the following aspects.

The first aspect: A method for manufacturing a three-dimensional shaped object by alternate repetition of a powder-layer forming and a solidified-layer forming, the repetition comprising:

(i) forming a solidified layer by irradiating a predetermined portion of a powder layer with a light beam, thereby allowing a sintering of the powder in the predetermined portion or a melting and subsequent solidification of the powder; and (ii) forming another solidified layer by newly forming a powder layer on the formed solidified layer, followed by an irradiation of a predetermined portion of the newly formed powder layer with the light beam, wherein a part of a region for the formation of the solidified layer is not irradiated with the light beam to form a non-irradiated portion, thereby providing at least one slit-groove at an upper surface of the three-dimensional shaped object, the slit-groove being for reducing a stress of the three-dimensional shaped object.

The second aspect: The method according to the first aspect, wherein a plurality of the slit-grooves are provided such that they have a regular arrangement at the upper surface of the three-dimensional shaped object.

The third aspect: The method according to the first aspect or the second aspect, wherein a slit-opening of the slit-groove has a shorter dimension of 0.05 mm to 1 mm.

The fourth aspect: The method according to any one of the first to third aspects, wherein a depth dimension of the slit-groove is in the range of 10% to 50% with respect to a thickness dimension of the three-dimensional shaped object.

The fifth aspect: The method according to any one of the first to fourth aspects, wherein a slit-opening of the slit-groove is provided such that a shorter dimension of the slit-opening gradually increases from a bottom of the slit-groove to the upper surface of the three-dimensional shaped object.

The sixth aspect: The method according to any one of the first to fifth aspects, wherein a slit-opening of the slit-groove has a longer direction which is in at least two orientations.

The seventh aspect: The method according to the sixth aspect, wherein the slit-opening has a shape of a cross.

The eighth aspect: The method according to any one of the first to seventh aspects, wherein the three-dimensional shaped object used as a mold for a resin product is manufactured, a parting-surface of the mold being provided with the slit-groove.

The ninth aspect: The method according to any one of the first to eighth aspects, wherein the slit-groove is filled with a filling material.

The tenth aspect: A three-dimensional shaped object made of laminated solidified layers, each of the laminated solidified layers being formed by irradiating a powder layer with a light beam,
wherein the three-dimensional shaped object has at least one slit-groove at an upper surface of the three-dimensional shaped object, the slit-groove being for reducing a stress of the three-dimensional shaped object.

The eleventh aspect: The three-dimensional shaped object according to the tenth aspect, wherein a plurality of the slit-grooves at the upper surface of the three-dimensional shaped object are in a regular arrangement.

The twelfth aspect: The three-dimensional shaped object according to the tenth aspect or the eleventh aspect, wherein the three-dimensional shaped object is one used as a mold for a resin product, a parting-surface of the mold being provided with the slit-groove.

The thirteenth aspect: The three-dimensional shaped object according to the twelfth aspect, wherein the slit-groove serves as a gas-vent in a resin molding process.

INDUSTRIAL APPLICABILITY

The manufacturing method according to an embodiment of the present invention can provide various kinds of articles. For example, in a case where the powder layer is a metal powder layer (i.e., an inorganic powder layer) and thus the solidified layer corresponds to a sintered layer, the three-dimensional shaped object obtained by an embodiment of the present invention can be used as a metal mold for a plastic injection molding, a press molding, a die casting, a casting or a forging. While on the other hand in a case where the powder layer is a resin powder layer (i.e., an organic powder layer) and thus the solidified layer corresponds to a cured layer, the three-dimensional shaped object obtained by an embodiment of the present invention can be used as a resin molded product.

CROSS REFERENCE TO RELATED PATENT APPLICATION

The present application claims the right of priority of Japanese Patent Application No. 2014-155292 (filed on Jul. 30, 2014, the title of the invention: "METHOD FOR MANUFACTURING THREE-DIMENSIONAL SHAPED OBJECT AND THREE-DIMENSIONAL SHAPED OBJECT"), the disclosure of which is incorporated herein by reference.

EXPLANATION OF REFERENCE NUMERALS

22 Powder layer
24 Solidified layer
100 Three-dimensional shaped object
130 Upper surface of three-dimensional shaped object
150 Slit-groove
150' Slit-opening
170 Parting-surface
190 Filling material
Dx Shorter dimension of slit-opening
Dz Depth of slit-groove
L Light beam.

The invention claimed is:

1. A method for manufacturing a three-dimensional shaped mold by alternate repetition of a powder-layer forming and a solidified-layer forming, the repetition comprising: (i) forming a solidified layer by irradiating a predetermined portion of a powder layer with a light beam, such that a sintering or melting of the powder in the predetermined portion and subsequent solidification of the powder occurs; and (ii) forming another solidified layer by newly forming a powder layer on the formed solidified layer, followed by an irradiation of a predetermined portion of the newly formed powder layer with the light beam, wherein: a part of a region for the formation of the solidified layer is not irradiated with the light beam to form a non-irradiated portion comprising at least one slit-groove such that the three-dimensional shaped mold finally obtained having the at least one slit-groove is provided at a parting-surface on an upper surface of the three-dimensional shaped mold, the at least one slit-groove is configured to reduce a stress of the three-dimensional shaped mold, a slit-opening of the at least one slit-groove has a long dimension which extends in at least two different orientations, the at least one slit-groove has a locally recessed shape at the parting-surface of the mold, and wherein the at least one slit-groove is configured for gas venting in a resin molding process.

2. The method according to claim 1, wherein the at least one slit-groove comprises a plurality of slit-grooves having a periodic arrangement at the upper surface of the three-dimensional shaped mold.

3. The method according to claim 1, wherein the slit-opening of the at least one slit-groove has a short dimension of 0.05 mm to 1 mm.

4. The method according to claim 1, wherein a depth dimension of the at least one slit-groove is in a range of 10% to 50% with respect to a thickness dimension of the three-dimensional shaped mold.

5. The method according to claim 1, wherein the slit-opening of the at least one slit-groove is provided such that a short dimension of the slit-opening gradually increases from a bottom of the at least one slit-groove to the upper surface of the three-dimensional shaped mold.

6. The method according to claim 1, wherein the slit-opening has a shape of a cross.

7. The method according to claim 1, wherein the three-dimensional shaped mold is used as a mold for manufacturing a resin product.

8. The method according to claim 1, wherein the at least one slit-groove is filled with a filling material.

9. A three-dimensional shaped mold comprising: laminated solidified layers, each of the laminated solidified layers being formed by irradiating a powder layer with a light beam; and a slit-groove provided at a parting-surface on an upper surface of the three-dimensional shaped mold, wherein: the slit-groove is configured to reduce a stress of the three-dimensional shaped mold, a slit-opening of the slit-groove has a long dimension which extends in at least two different orientations, the slit-groove has a locally recessed shape at the parting-surface of the mold, and wherein the slit-groove is configured for gas venting in a resin molding process.

10. The three-dimensional shaped mold according to claim 9, wherein a plurality of the slit-groove provided at the upper surface of the three-dimensional shaped mold in a periodic arrangement.

11. The three-dimensional shaped object according to claim 9, wherein the three-dimensional shaped mold is used as a mold for manufacturing a resin product.

* * * * *